Figure 1A:
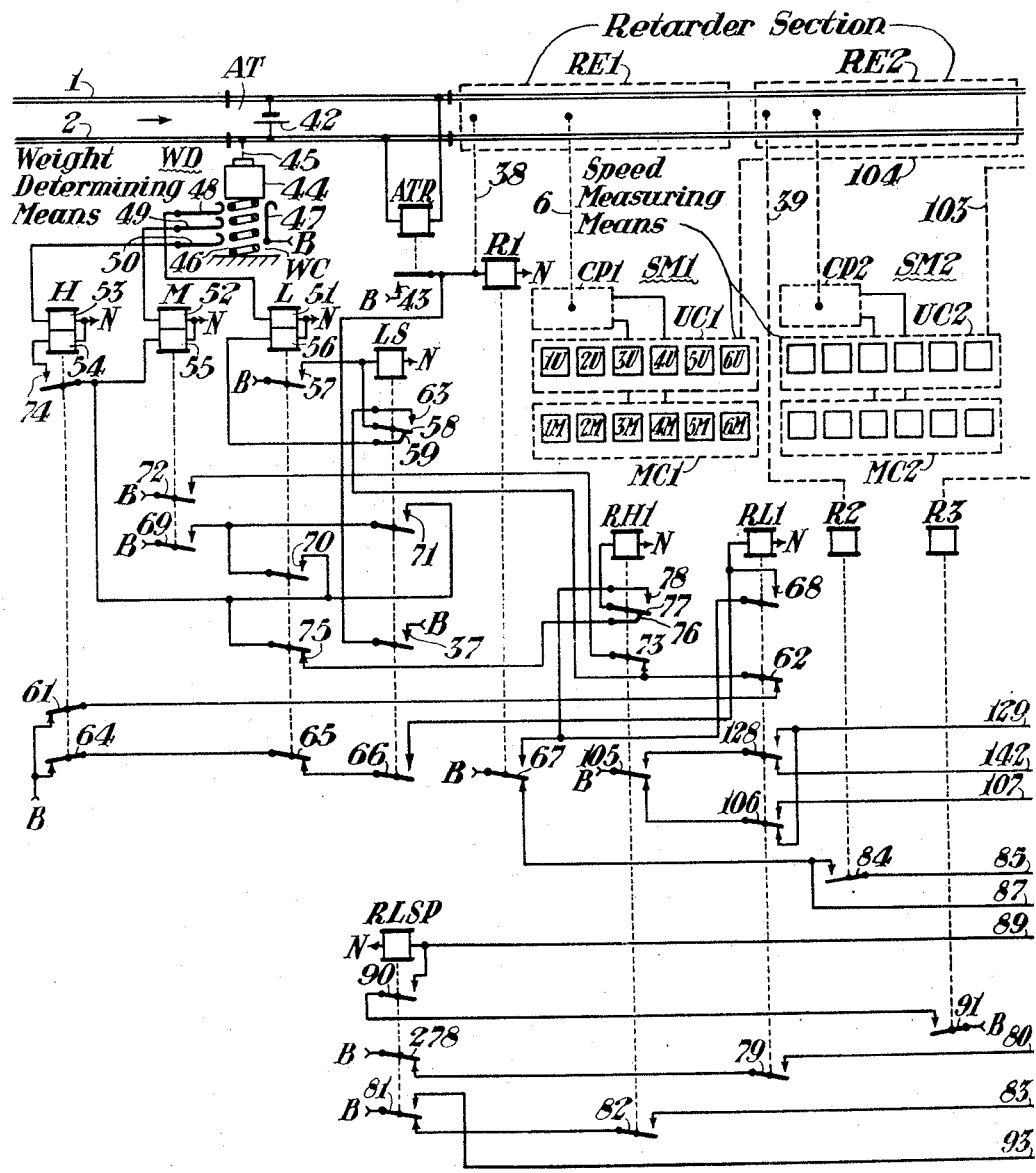

Jan. 14, 1958     E. C. FALKOWSKI     2,819,682
CAR RETARDER SPEED CONTROL APPARATUS

Filed Dec. 8, 1954     5 Sheets-Sheet 1

INVENTOR.
Edward C. Falkowski
BY
W. L. Stout
HIS ATTORNEY

INVENTOR.
Edward C. Falkowski
BY W. L. Stout
HIS ATTORNEY

Jan. 14, 1958  E. C. FALKOWSKI  2,819,682
CAR RETARDER SPEED CONTROL APPARATUS
Filed Dec. 8, 1954  5 Sheets-Sheet 4

INVENTOR.
Edward C. Falkowski
BY
W. L. Stout.
HIS ATTORNEY

Jan. 14, 1958 E. C. FALKOWSKI 2,819,682
CAR RETARDER SPEED CONTROL APPARATUS
Filed Dec. 8, 1954 5 Sheets-Sheet 5

INVENTOR.
Edward C. Falkowski
BY W. L. Stout
HIS ATTORNEY

United States Patent Office 2,819,682
Patented Jan. 14, 1958

2,819,682

CAR RETARDER SPEED CONTROL APPARATUS

Edward C. Falkowski, Edgewood, Pa., assignor to Westinghouse Air Brake Company, Wilmerding, Pa., a corporation of Pennsylvania Application December 8, 1954, Serial No. 473,819

20 Claims. (Cl. 104—26)

My invention relates to car retarder speed control apparatus, and more particularly to means for determining the weight of a car, storing the weight information and automatically controlling the retarder according to the stored weight information to obtain the desired car leaving speed.

At railway hump classification yards the speed that a car or a multiple car cut may attain depends among other things upon the weight of each car and its contents, and upon the rolling conditions. Since there is a correct sped at which a car or a multiple car cut should drift into the designated track in order that it may couple to cars already standing on that track without too great an impact, car retarders for governing the car speed are provided. Obviously, the degree of braking force that a retarder exerts must be varied according to the car weight as well as according to the rolling conditions, in order to obtain the correct speed for the car to pass into its classification track.

In order to have ample braking effort available it is customary to install two or more retarders end-to-end so that the composite retarder consists of two or more sections, each section being independent as to its motive means and control.

In many of the prior hump yard installations the retarders are electrically controlled by an operator in a tower located where he can observe the car cuts moving down the hump and govern the retarders as he deems necessary. This manual control requires a high degree of skill, judgment and perception on the part of the operator in order to obtain the desired speed at which each car cut should leave the retarder. It takes only approximately ten seconds for a car to pass through a retarder and there may be several cuts moving down the hump simultaneously. Thus an operator has little time to observe each car cut and check the factors which affect efficient operation.

I am aware that there are hump yard installations that include means for determining the weight and speed of a car and means for automatically controlling the braking effort of the retarder according to these factors to obtain desired leaving speeds. Also that these installations permit the leaving speeds to be preselected and thereby obtain leaving speeds best suited for the switching conditions at the time.

Accordingly, it is an object of my invention to provide improved car retarder speed control apparatus which assures switching operation of high efficiency and reliability.

A further object of my invention is the provision of improved means for determining the weight of a car approaching a retarder, storing the weight information and utilizing the stored informations in automatic control of the retarder.

Again, an object of my invention is the provision of improved car weight determining means which classifies the cars being switched into a plurality of different weight groups and stores the weight group information for use in automatic control of each section of a multiple section retarder.

Another object of my invention is the provision of improved railway car weight determining means which registers the weight of each pair of wheels and axle of a car or multiple car cut and delays the storing of the weight information until the car cut has fully passed the weighing means so that the maximum registered weight determines the information stored.

Still another object of my invention is the provision of improved railway car weight determining means which assures that the registered weight for a car is not lost until it has been individually stored for each section of a retarder.

Another object of my invention is the provision of car weight register and storage apparatus including improved means whereby any single cut involving cars of more than one car weight group is treated as being of a preselected weight group.

Another object of my invention is the provision of railway car weight determining means employing improved registering, transferring, and storing relay circuits which operate on a sequence basis and are free from marginal timing.

Another object of my invention is the provision of improved railway car weight determining apparatus which minimizes the number of relays required to record and store the weight information and which permits the use of relays of standard types.

Still another object of my invention is the provision of improved car retarder speed control apparatus which provides means for compensating for the rolling conditions of a single or multiple car cut.

Also an object of my invention is the provision of improved weight storage information circuits for releasing each section of a multiple section retarder as a car vacates the section and permitting a new car weight to be stored in the section for control of a closely following car.

Again, an object of my invention is the provision of retarder control apparatus which gradually slows down a car cut or allows it to speed up so that it leaves the final retarder section at the desired leaving speed without having traveled an appreciable portion of the retarder at the leaving speed.

Other objects, features, and advantages of the apparatus embodying my invention will appear as the specification progresses.

Briefly described, the apparatus provided according to my invention includes car weight determining means, weight information transfer relay means, weight information storage relay means, end-of-cut determining relay means, speed measuring means, braking force speed selective control circuit networks, and a rollability compensating switch means.

The weight determining means includes a weighing or weight responsive device and a group of weight recording or registering relays. The weighing device has an operating element mounted in the trackway in the approach to the retarder and may be either a mechanical contact device or an electromagnetic device made selectively responsive to each pair of wheels and axle of a car according to the weight thereof. Preferably the cars are classified into different weight groups and the registering relay group includes an individual relay for each car weight group. As an aid to the understanding of the apparatus I shall assume by way of illustration but in no manner as a limitation of my invention that there are three weight groups of cars, namely, (1) cars which with their contents weigh less than forty tons, (2) cars and contents weighing between forty to sixty tons, and (3) cars and contents weighing over sixty tons. In other words, the cars are classified into light, medium, and heavy weight groups.

The recording or registering relays are of a quick acting type and are provided with pickup and stick circuits arranged to selectively energize the relays according to the car weight. The registering relays through weight information transfer relays control weight information storage relays. The storage relays comprise one or more relay groups, each of which is selectively energized in a different combination or arrangement for each car weight group and thereby stores by its energized arrangement the weight group information of the car cut approaching the retarder. The transfer relays and circuits insure that the registered weight information is not lost until it is stored and also that the weight information is not stored until the car cut has passed the weighing device and the maximum car weight of the cut is registered. Preferably, these relays and circuits are made to operate on a sequence basis and are free from close time margins, and operate accurately during the extremely short operation time of the weighing element.

The car weight information stored for the first retarder section is progressively stored at other storage relay groups for other retarder sections. Each storage relay group cooperates with the speed measuring means for each retarder section in selecting retarder control circuits in the corresponding braking force speed selective network. These control circuits determine initial and partial braking forces and partial and full release speeds to each retarder section to gradually obtain a final leaving speed predetermined for the particular car weight group.

The compensating switch means is made to cooperate with the storage relay groups in the circuit selection of the braking force selective network to compensate for rolling characteristics of a car cut, and other conditions.

I shall describe three forms of apparatus embodying my invention and shall then point out the novel features thereof in claims.

Figure 1B:
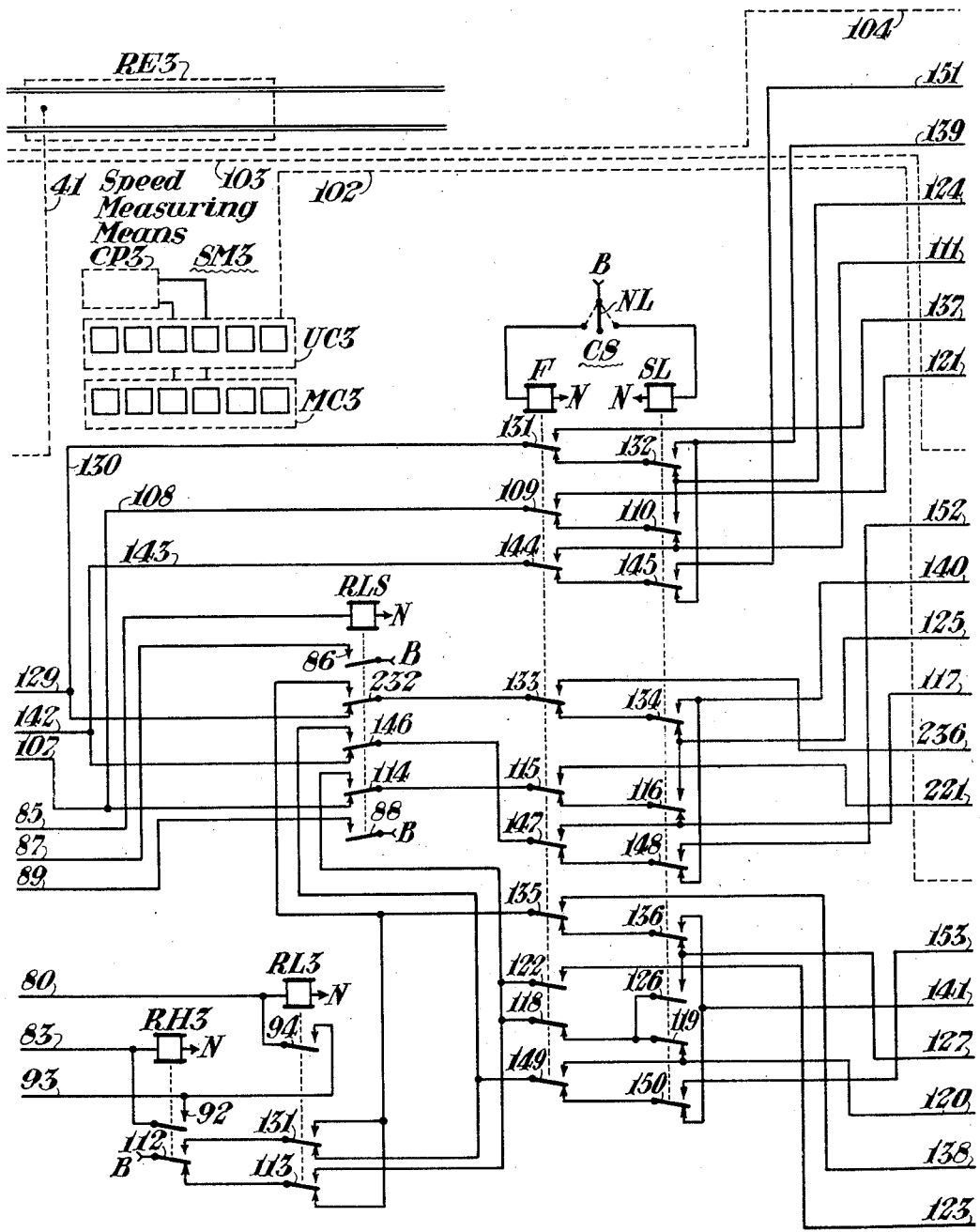
Figure 1C:
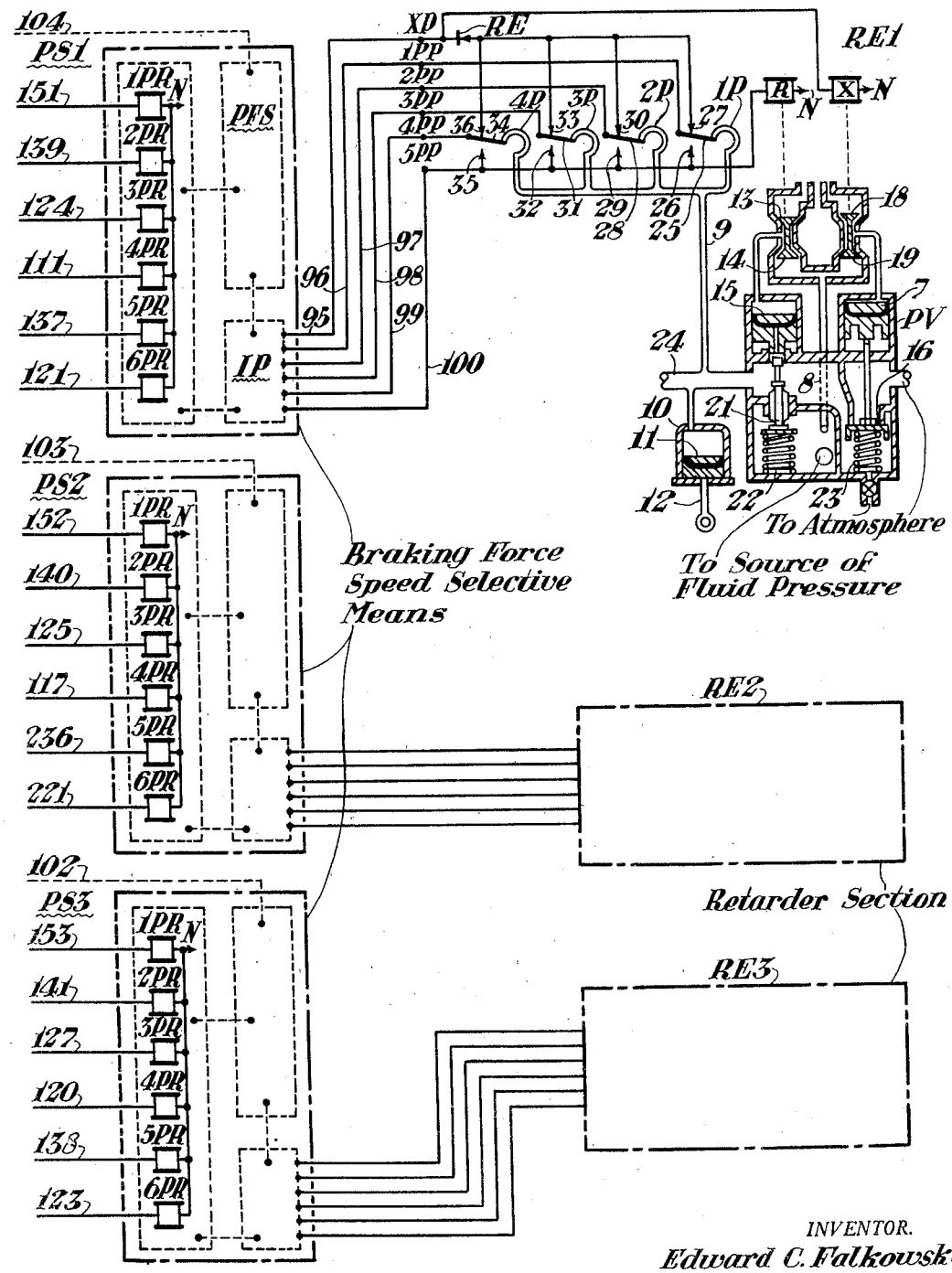

In the accompanying drawings, Figs. 1a, 1b, and 1c, when placed side by side in the order named with Fig. 1a at the left, are diagrammatic views showing a first form of apparatus embodying my invention.

Figure 2:
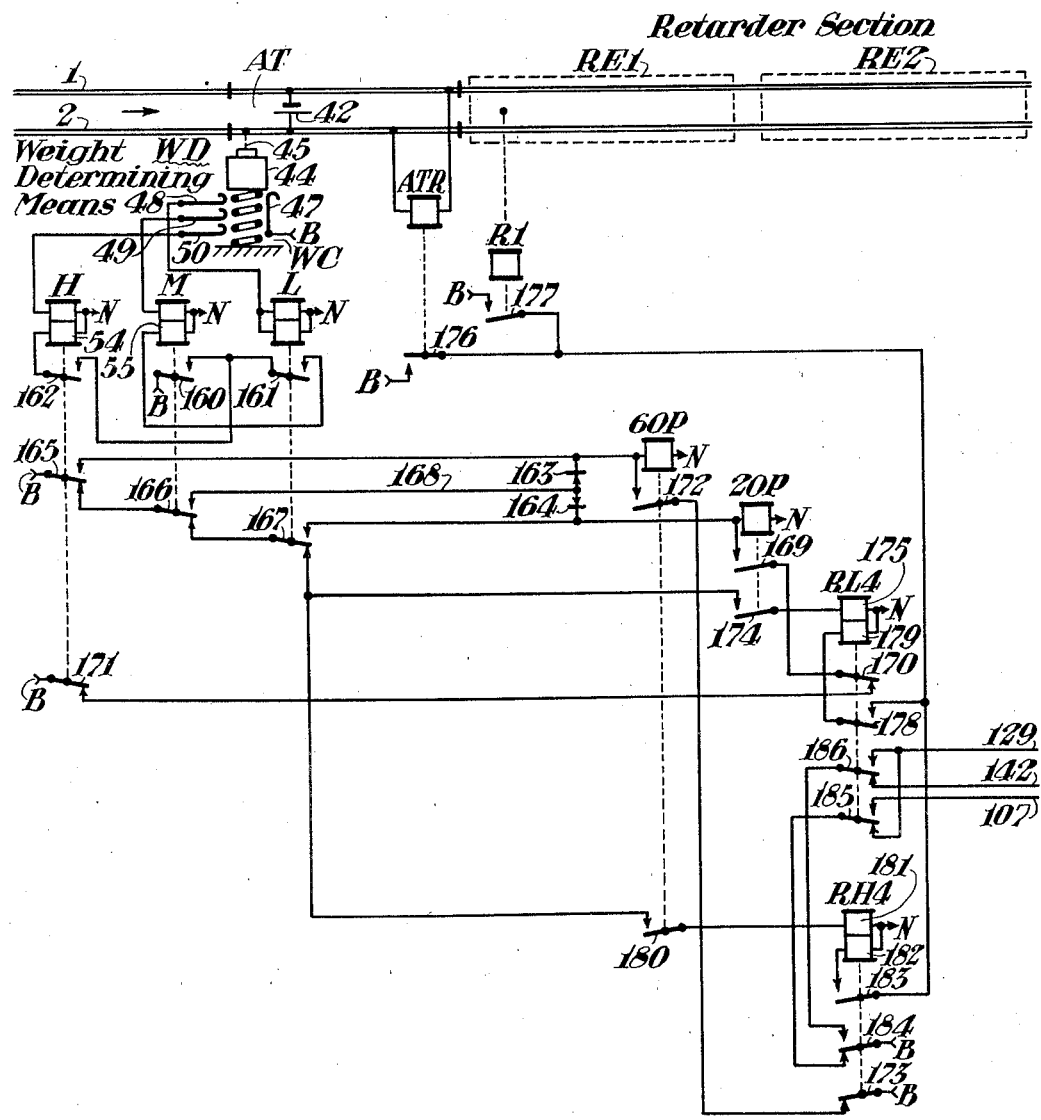
Figure 3:
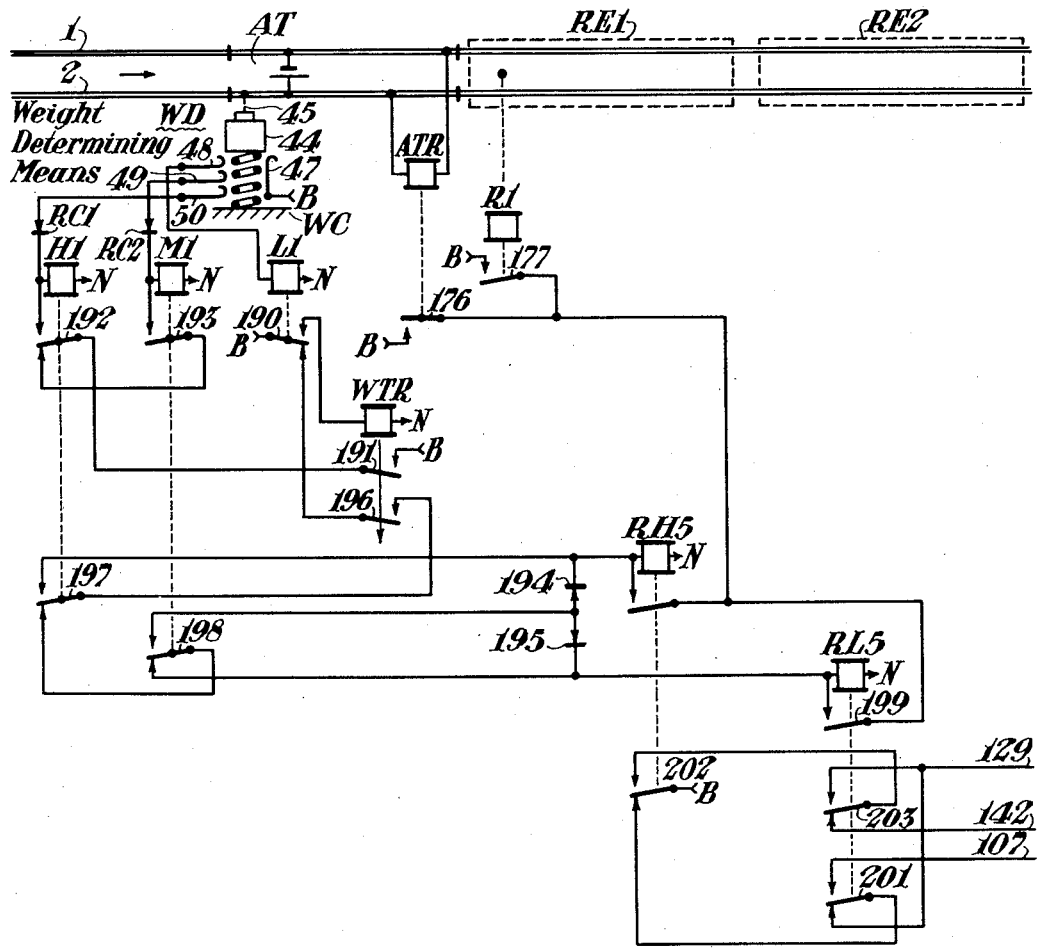

Figs. 2 and 3 are fragmental diagrammatic views showing a second and a third form of weight determining and storage means that may be used and which also embody the invention.

In each of the different views like reference characters are used to designate similar parts.

Referring first to Figs. 1a and 1b, the reference characters 1 and 2 indicate the track rails of a stretch of railway track over which cars are switched in the direction indicated by an arrow, the cars moving under gravity from a hump to classification tracks. This stretch is provided with a car retarder which, as shown, comprises three sections RE1, RE2 and RE3 through which cars pass in the order named. It is to be understood that the retarder may consist of only one section, or two sections or more than three sections as may be required. Preferably, these retarder sections are of like construction with independent motor operating means. They are shown conventionally by dotted line rectangles since they may be of any one of the several known constructions, and their specific construction forms no part of my present invention. As an aid in understanding the apparatus of my invention I shall assume that the retarder sections are of the widely used mechanism disclosed in Letters Patent of the United States No. 1,927,201, granted September 19, 1933, to Herbert L. Bone for Railway Braking Apparatus. In this type of electropneumatic retarder, braking bars mounted parallel with the track rails are biased to an open or nonbraking position and are moved to a braking position where they engage the sides of the wheels of a car by a plurality of separately operated pneumatic units each comprising a cylinder provided with a piston. Air pressure is supplied to and exhausted from the cylinders of the several units through a control valve which in turn is controlled by magnet valves.

In Fig. 1c a portion of the mechanism for the retarder section RE1 is disclosed and this mechanism will be described to the extent necessary for an understanding of the manner in which the apparatus embodying the invention can be used to control the braking force of a retarder. In Fig. 1c, a cylinder 10 is that of one of the separately operated units of the retarder, each operating unit having a similar cylinder. The cylinder 10 contains a piston 11 attached to a piston rod 12, the outer end of which is adaptable of being connected to the braking bars by a suitable linkage not shown. This linkage includes spring biasing means and when the cylinders are exhausted to atmosphere the braking bars are moved to an open or nonbraking position and piston 11 occupies the upper end of the cylinder 10 as viewed in the drawing. When fluid pressure is admitted to cylinder 10 above the piston 11, the piston is forced downward and the braking bars are moved to a closed or braking position, the braking force exerted being determined by the pressure of the actuating fluid which is compressed air having a maximum pressure of the order of 110 pounds per square inch. The supply of air pressure to cylinder 10 is governed by a control valve PV which in turn is controlled by two magnet valves R and X. As here illustrated, fluid pressure is admitted to cylinder 10 to close the retarder RE1, under normal or standby conditions, that is, when no car is passing through the retarder. This standby condition is effected by magnet R being energized and magnet X being deenergized. With magnet R energized in a manner to appear later, valves 13 and 14 actuated thereby are forced downward to close valve 13 and open valve 14. With valve 14 open, pressure from a suitable source not shown is admitted through a port 8 to a chamber above a piston 15 of control valve PV, forcing piston 15 downward against the force of spring 22 to open a control valve 21. With control valve 21 open pressure is admitted from the source to pipe 24 leading to cylinder 10 and pressure is supplied to close the retarder. With magnet X deenergized valves 18 and 19 are moved upward to open valve 18 and close valve 19. With valve 18 open, the chamber above a piston 7 is exhausted to atmosphere and a valve 16 is closed by bias spring 23 and an exhaust port of pipe 24 is blanked.

When magnet X is energized and magnet R deenergized, the retarder is operated to its open position. With magnet X energized, the valves 18 and 19 are forced downward to close valve 18 and open valve 19. Also with magnet R deenergized, valves 13 and 14 are forced upward to close valve 14 and open valve 13. Under this condition pressure from the source is admitted through port 8 to the chamber above piston 7 and valve 16 is forced downward against the force of spring 23 to open the valve and exhaust cylinder 10 to atmosphere. At the same time, with valve 14 closed and valve 13 open, the chamber above piston 15 is exhausted to atmosphere with the result control valve 21 is closed to blank the supply to pipe 24.

The magnets R and X are controlled in part by pressure responsive devices 1P, 2P, 3P and 4P, each of which comprises a Bourdon tube connected by pipe 9 to pipe 24 and having a contact actuating member. For example, the tube of device 1P actuates a contact member 25 between a first position where it engages a stationary contact 26 and a second position where it engages a stationary contact 27. Similarly, the tube of device 2P actuates a contact member 28 between a first position contact 29 and a second position contact 30, the tube of device 3P actuates a contact member 31 between contacts 32 and 33, and the tube of device 4P actuates a contact member 34 between contacts 35 and 36.

These pressure responsive devices are so constructed and adjusted that they operate successively as the pressure in cylinder 10 increases. For example, for all pressures below 20 pounds per square inch the first position contact of each device is closed. If the pressure exceeds 20 pounds per square inch, the contact 25—26 of device 1P is opened and if the pressure exceeds 30 pounds per square inch, the contact 25—27 is closed. Similarly, the first position contact 28—29 of device 2P opens when the pressure exceeds 35 pounds and its second position contact 28—30 is closed when the pressure exceeds 45 pounds per square inch. Again, the first position contact 31—32 of device 3P opens when the pressure exceeds 50 pounds and its second position contact 31—33 is closed when the pressure exceeds 60 pounds. The fourth device 4P may be set for its first position contact 34—35 to open for pressures above 70 pounds and its second position contact 34—36 to close for pressures above 80 pounds. Obviously, the retarder mechanism is not limited to these adjustments and other steps in pressure can be used. Also a fewer number or a greater number of pressure responsive devices can be provided for the retarder.

It should be pointed out at this time that a suitable source of control current is provided, this power source being preferably a battery of proper voltage and capacity, but for the sake of simplicity this power source is not shown in the drawings, its positive and negative terminals being identified by the conventional reference characters B and N, respectively.

It is to be seen for Fig. 1c, that, when positive energy is applied to a terminal XP of the retarder section RE1, the magnet X is energized and the magnet R is deenergized with the result the retarder section is operated to its open or released position. When positive energy is removed from terminal XP and applied to a terminal 1PP, the magnet X is deenergized and magnet R is energized through contact 25—26 of device 1P, and pressure of the source is admitted to pipe 24 leading to cylinder 10. When the pressure builds up to and exceeds 20 pounds, the contact 25—26 is opened and magnet R deenergized with the result pressure just in excess of 20 pounds is retained in cylinder 10.

If the pressure in cylinder 10 should build up and exceed 30 pounds, the second position contact 25—27 is closed with the result magnet X is energized over a path including contact 25—27 and a half-wave rectifier element RE and the control valve PV is actuated to exhaust the pressure in cylinder 10 until it is reduced to something below 30 pounds and contact 25—27 opens causing magnet X to be deenergized. On the other hand, if the pressure in cylinder 10 falls below 20 pounds, the contact 25—26 is reclosed and magnet R energized to open the valve 21 and admit pressure from the source until the pressure builds up enough to again cause contact 25—26 to open.

In a similar manner, when positive power is applied to terminal 2PP of retarder section RE1, the magnet R is energized through contact 28—29 of device 2P and magnet X can be energized through contact 28—30 of device 2P and rectifier element RE with the result the pressure applied to cylinder 10 is maintained between 35 and 45 pounds per square inch. Likewise, when positive energy is applied to terminal 3PP of the retarder section RE1, the magnets R and X are controlled over contacts 31—32 and 31—33 of device 3P and the pressure applied to cylinder 10 maintained between 50 and 60 pounds. With positive energy applied to terminal 4PP, the magnets R and X are controlled through contacts 34—35 and 34—36 of device 4P and the pressure in cylinder 10 maintained between 70 and 80 pounds. Finally, when positive energy is applied to terminal 5PP, the magnet R is energized and the maximum pressure of the source is applied to cylinder 10.

It follows from the above that the retarder section RE1 can be set to apply any one of five different braking forces and also it can be fully released or opened. While I have shown six different control conditions for the retarder section, it is apparent that the retarder structure can be arranged for a lesser or a greater number of control conditions, the controls here shown being those frequently used in retarders. Furthermore, it is clear the retarder RE1 can be set to be normally open if desired.

In manual control of a car retarder, positive energy is selectively supplied to the terminals XP and 1PP to 5PP, inclusive, through a manually operable lever having a different position for each control condition. When the retarder is controlled automatically as by apparatus embodying my invention, this manual control is disconnected and positive energy selectively applied to the retarder control terminals through circuits of the apparatus. In the drawings the manual control means is not shown in order to not unduly complicate the drawings, this manual control means not being involved in the invention.

It is to be pointed out that the structures for retarder sections RE2 and RE3 are substantially the same in each case as that disclosed and described above for the section RE1. Consequently, the retarder structures RE2 and RE3 are indicated in Fig. 1c by dash-dot rectangles for simplicity.

As set forth hereinbefore each retarder section is provided with speed measuring means for repeatedly checking the speed of a car passing through the retarder section. These speed measuring means for retarder sections RE1, RE2 and RE3 are identified by the reference characters SM1, SM2 and SM3, respectively.

These speed measuring means may take different forms and preferably they are alike and may be similar to that disclosed in Letters Patent of the United States No. 2,320,802, granted June 1, 1943, to Clarence S. Snavely for Railway Braking Apparatus, and which speed measuring means is improved and further disclosed in a copending application for Letters Patent of the United States Serial No. 283,931, filed April 23, 1952, by David P. Fitzsimmons for Railway Car Speed Determining and Control Apparatus, now Patent No. 2,751,492, granted June 19, 1956. Reference is made to the Snavely and Fitzsimmons patents, which are of common ownership with the present application, for a full description of the car speed measuring means here contemplated. It is sufficient for the present application to disclose the speed measuring means conventionally and describe it only to the extent needed for a full understanding of its relationship with the other devices of the apparatus embodying my invention.

Referring to the speed measuring means SM1 for retarder section RE1 and reviewing briefly from the above mentioned publications, the means SM1 comprises a series of track circuits within the retarder section and time measuring means to determine the time consumed by a pair of car wheels in moving through each individual track circuit. The track within the retarder RE1 is formed with a series of short insulated sections. These sections are of the same length and a length of the order of 3 feet 1½ inches is suitable for the retarder here contemplated and also this length is such that only one pair of car wheels can occupy a section at a time. Each track section is provided with a track circuit having a track relay which is connected into a holding or stick circuit, a shunting circuit and a pickup or reset circuit. The holding circuit for each track relay includes a front contact of the relay and a front contact of all the track relays of the following track sections except the relay for the leaving track section. The shunting circuit includes the track rails of the corresponding section so that the relay is shunted and released in response to a pair of car wheels occupying the section. The reset circuit is such that all the track relays are picked up in cascade and a relay can be picked up only when all the relays in the rear are picked up. This control of the track relays assures that the track relays are successively released in response to the leading pair of car wheels passing through the track sections. The control is passed to the next pair of wheels in the rear when the leading pair of wheels leaves the last track section and is successively passed to the other pairs of wheels until the last pair of wheels of the car or car cut leaves the last track section.

These track relays are used to control the time measuring means to determine the car speed in each section by measuring the time consumed by a pair of wheels in moving through each individual track section. These track relays are not shown for the sake of simplicity and their control of the time measuring means is indicated by a dotted line 6.

The time measuring means comprises an alternating current cycle repeater CP1, a unit cycle counter UC1, and a multiple cycle counter MC1. The cycle repeater CP1 includes quick acting relays and rectifiers connected to a source of alternating current, such as the usual 60 cycle commercial power, in such a manner as to alternately close a pair of contacts in step with the cycles of the alternating current. The unit cycle counter UC1 includes a chain of six relays 1U to 6U, inclusive. This chain is connected to the contacts of the cycle repeater and the relays are operated one after another by current pulses created by the alternate operation of the repeater contacts. Thus, this chain is advanced one relay each cycle of the alternating current. The relays of this chain are interconnected so that, when the count of six is exceeded, the chain doubles back and continues to count over and over again. The multiple cycle counter MC1 includes a chain of six relays 1M to 6M, inclusive. This chain MC1 is connected to the chain UC1 in such a manner as to progressively pick up the relays one each time the unit chain completes a round trip operation. Thus the six relays of the multiple counter MC1 are all picked up in response to six round trip operations of the unit chain UC1. That is, the relays of the multiple cycle counter MC1 are all picked up in response to 36 cycles of the alternating current. It follows that the extreme position of this time measuring means is reached in seven round trip operations of the unit cycle counter UC1 or in 42 cycles of the alternating current, the total time being about 7/10 second or 700 milliseconds when 60 cycle alternating current is used. It is clear that the particular relays of the two chains which are picked up at any instant are a measure of the time consumed after the initiating of the operation. For example, if the relays 6M and 6U are picked up while a pair of car wheels moves through the 3 feet 1½ inches of a track section, the average speed of the car in that section is approximately 3.1 miles per hour. Hence, this speed measuring means is capable of measuring a range of car speeds from 3 to 25 miles per hour for each track section. The control of the track relays over the speed measuring means SM1 is such that the time measuring means is reset and a new operation initiated for each track section.

The speed measuring means SM2 and SM3 are substantially of the same construction as the means SM1, the means SM2 being controlled by track circuits of the retarder section RE2, and the means SM3 being controlled by track circuits of retarder section RE3.

Occupancy relays are used to detect the occupancy of each retarder section, relays R1, R2 and R3 being provided for sections RE1, RE2 and RE3, respectively. Preferably, each occupancy relay is controlled by the track circuits provided for each retarder section for control of the associated speed measuring means. These controls of the occupancy relays are shown conventionally because the specific circuit arrangement by which each occupancy relay is made to detect the passing of a car cut through the retarder section is not a part of my invention. For example, the control of relay R1 by a car passing through section RE1 is indicated by a dotted line 38, and the controls of relays R2 and R3 are indicated by dotted lines 39 and 41, respectively.

Furthermore, the apparatus includes an insulated track section AT formed in the stretch of track in the approach to the entrance of the first retarder section RE1. The length of this track section AT may be of any suitable length and I have found that a length of the order of 55 feet is suitable for the combined length of section AT and the first retarder section RE1. Of course, an approach track section of a different length can be used. The track section AT is formed with a track circuit including a track battery 42 and a track relay ATR, the relay ATR being shunted to close back contact 43 when the section AT is occupied. The relay ATR controls an auxiliary circuit for relay R1, the relay R1 being energized and picked up when relay ATR is shunted, closing back contact 43, as will be apparent from an inspection of Fig. 1a. The relay R1 is further provided with another auxiliary circuit including front contact 37 of a transfer relay LS to be referred to hereinafter.

The car weight determining means here provided for the first form of apparatus is indicated as a whole by the reference character WD and includes a weighing or weight responsive device WC and a group of three recording or registering relays L, M and H. This weight responsive device WC is shown as including a circuit contactor having mechanical connections to rail 2 for operation in response to the deflection of the rail as a car wheel rolls over the rail at the point of connection. Specifically, a circuit contact member 44 is actuated by the deflections of rail 2 through a suitable linkage indicated conventionally by dotted line 45, there being several such linkages known to the art. The contact member 44 is biased by spring 46 to an upper or open position, that is, to the position shown in the drawing. Deflection of the track rail forces contact member 44 downward against the force of spring 46, the member 44 constantly engaging a stationary contact 47 and selectively engaging stationary contacts 48, 49 and 50 according to the deflection of the track rail.

As set forth hereinbefore by way of illustration, the cars are classified into light (less than 40 tons), medium (between 40 and 60 tons), and heavy (over 60 tons) weight groups. Accordingly the contactor WC is proportioned and adjusted for the contact member 44 to be forced downward to close contact 47—48 for light weight cars, to close contact 47—49 for medium weight cars, and to close contact 47—50 for heavy weight cars. That is, the contact member 44 has a construction such that only contact 47—48 is closed for light weight cars, both contacts 47—48 and 47—49 are closed for medium weight cars, and all three contacts 47—48, 47—49 and 47—50 are closed for heavy weight cars.

The recording relays L, M and H may be of any one of several types of relays and may be quick acting D. C. neutral relays having two windings, one used as a pickup winding and the other as a stick winding. The pickup winding 51 of relay L is energized over a simple circuit including contact 47—48 of the contactor, pickup winding 52 of relay M over a circuit including contact 47—49, and pickup winding 53 of relay H over a circuit including contact 47—50 of the contactor. When a wheel of the leading pair of a car approaches the point at which the contactor is attached to the rail 2, the relay L is energized and picks up. If the deflection of the rail increases as it will for a medium weight car, first the relay L and then the relay M pick up. With the rail still further deflected for a heavy weight car, the relays L, M and H pick up in sequence. When the wheel of a heavy car recedes from the point of measurement, the rail deflection decreases and soon winding 53 of relay H is deenergized and that relay releases unless its stick winding 54 is energized. As the wheel further recedes, winding 52 of relay M and then winding 51 of relay L is deenergized and these relays release unless their stick windings 55 and 56 are supplied with current. This action of the weight responsive device is repeated for each pair of wheels of a single car or multiple car cut.

It is clear that in place of the mechanical contactor type of weight responsive device an electromagnetic device can be used to energize the recording relays. Also, since the light weight relay L is energized for all car groups, its pickup winding can be controlled by a short track circuit located at the point of measurement.

A stick circuit network and a transfer relay LS are provided so that but a single operation of the recording relays is required, in order that the recorded weight cannot be submitted to weight information storage relays, to be referred to shortly, until the cut has passed the measuring point and the maximum weight registered, and in order to insure that the weight information is not lost until it is stored for each car cut.

The weight information storage relay means includes two storage relay groups of two relays each and a pair of end-of-cut relays. Relays RL1 and RH1 are a first group, relays RL3 and RH3 are a second group, and relays RLS and RLSP are end-of-cut relays. These relays are all of a standard form of direct current relays, the relays LS and RH1 each being equipped with continuity transfer contacts of the well-known arrangement.

It is believed that the foregoing circuit network, transfer and storage relays can best be understood from a description of their operation in response to cars of the different weight classification groups.

Under normal or standby conditions, that is, when no car is passing through any of the retarder sections and none is approaching, all the relays associated with the weight determining means as well as the occupancy relays are deenergized and released.

Assuming a light weight car approaches and its leading pair of wheels enters section AT, the occupancy relay R1 is at once energized due to the shunting of relay ATR. When the leading pair of wheels moves over the weight measuring point the contact 47—48 is closed and relay L is energized over its pickup circuit and then is energized by its stick winding 56 being supplied with current over its own front contact 57 and continuity transfer back contact 58—59 of relay LS. Relay LS is now supplied with current over a pickup circuit including front contact 57 of relay L and then is retained energized by a stick circuit extending from terminal B over back contact 61 of relay H, back contact 62 of relay RL1, continuity transfer front contact 58—63 and winding of relay LS to terminal N. When this leading pair of wheels of the light weight car recedes from the measuring point, relay L is released because its pickup and stick circuits are open. At this time storage relay RL1 is energized through a pickup circuit traced from terminal B over back contacts 64 and 65 of relays H and L, respectively, front contact 66 of relay LS and winding of relay RL1 to terminal N. With relay RL1 picked up, it is retained energized over a stick circuit completed at front contact 67 of relay R1 and its own front contact 68. Hence, the weight information of this light weight car is stored at relay RL1 until the car has passed through the approach track section AT and the retarder section RE1 and occupany relay R1 is released. It is to be noted that relay R1 may be energized over its auxiliary circuit including front contact 37 of transfer relay LS. This auxiliary circuit permits the trackway element 45 of the weighing device to be attached to the rail in the approach to section AT or the section AT even omitted, these layouts being desirable at some yards. With storage relay RL1 picked up opening back contact 62, transfer relay LS is deenergized and released so that both relays L and LS are reset for operation by the next pair of wheels of the light weight car. As will be explained later, once the light weight information is stored at relay RL1, further operation of relays L and LS serves to check whether or not the weight registered for the remaining pairs of wheels of the car falls in the light weight group, and to change the stored information when a different car weight is registered.

Assuming next a heavy weight car aproaches and its leading pair of wheels enters section AT and rolls over the weight measuring point, relay R1 is first picked up and then recording relays L, M and H are energized in sequence. The relay L is first energized by current supplied to its pickup winding 51. Then transfer relay LS is energized the same as for a light weight car. As the rail is further deflected and relay M is energized by current supplied to its pickup winding 52, it is retained energized by a stick circuit which at first extends from terminal B through front contact 69 of the relay, front contact 70 of relay L and stick winding 55 to terminal N. Then when relay LS picks up, the stick circuit of relay M is completed at front contact 71 of relay LS in multiple with front contact 70 of relay L. At this time relay LS is provided with a stick circuit which includes terminal B, front contact 72 of relay M, back contact 73 of relay RH1, continuity transfer front contact 58—63 and winding of relay LS and terminal N. With further deflection of the rail, relay H becomes energized by current supplied to its pickup winding 53 and is retained picked up by current supplied to its stick winding 54 from terminal B over front contact 69 of relay M, front contact 71 of relay LS, front contact 74 and winding 54 of relay H to terminal N.

As the leading wheel of the heavy weight car recedes from the point of measurement, the relays H, M and LS are retained picked up due to their stick circuits but relay L releases, since its stick circuit is open, when the weighing device WC is reset. At this time current flows from terminal B over front contact 69 of relay M, front contact 71 of relay LS, back contact 75 of relay L, back continuity transfer contact 76—77 of relay RH1, and winding of that relay to terminal N, and relay RH1 picks up. Relay RH1 is then retained energized by a stick circuit completed at front contact 67 of occupancy relay R1 and its own continuity transfer front contact 77—78. This results in storage relay RH1 being held energized until this heavy weight car has passed through track section AT and retarder section RE1 and relay R1 is released to open its front contact 67.

Once the heavy weight car information is stored at relay RH1, the opening of back contact 73 of relay RH1 opens the stick circuit for relay LS and that relay releases to open its front contact 71 and thus open the stick circuits for relays M and H with the result the recording relays are reset ready to respond to the next pair of wheels of the car. Again, as will appear later, once the heavy weight car information is stored at relay RH1, operation of the recording relays by the remaining wheels of the heavy weight car serves to check the weight registered and to change the stored information when there is a change in the registered weight.

When a medium weight car approaches and its leading pair of wheels and axle enter section AT and roll over the operating element of the weighing device, the occupancy relay R1 is first picked up as previously described and the recording relays L and M are energized by current supplied to their pickup windings, but relay H remains released. The operations of energizing transfer relay LS and the closing of the stick circuits for relays L, LS and M are the same as before except this time the stick circuit for relay LS is completed over two alternate paths one of which includes front contact 72 of relay M and back contact 73 of relay RH1 and the other of which paths includes back contact 61 of relay H and back contact 62 of relay RL1. Hence relay LS is retained energized until both storage relays RL1 and RH1 are picked up. As the leading wheel of the medium weight car recedes from the weighing device and relay L is released, the previously traced pickup circuits for both relays RL1 and RH1 are closed and both storage relays are energized and pick up. Once picked up, these storage relays are retained energized by their stick circuits completed at front contact 67 of relay R1 while the car passes through track section AT and retarder section RE1. When both storage relays are picked up, the transfer relay LS and recording relay M are released and the weighing device is reset ready for a new operation by the next pair of wheels of the car. Again, once the medium car weight information is stored at relays RH1 and RL1, further operation of the weighing devices and registering relays by the remaining car wheels serves to check the weight. It follows that the storage relays RH1 and RL1 are energized in three different combinations or arrangements for light, medium and heavy cars, namely, (1) relay RL1 is energized and relay RH1 deenergized for a light weight car, (2) both relays RL1 and RH1 are energized for a medium weight car, and (3) relay RH1 is energized and relay RL1 deenergized for a heavy weight car.

I shall next consider the operation of the weight determining means for unevenly loaded single car cuts where the weights on the different axles of the car fall in the different weight groups, and also where the different cars of a multiple car cut fall in the different weight groups. The recording relays L, M and H are energized according to the weight group of the leading pair of wheels and axle and the corresponding weight information is stored by the corresponding combination of relays RH1 and RL1. In case the weight on a subsequent axle of the cut is of a different weight group, the other storage relay is energized if both are not already energized for the first axle, as will be apparent from an inspection of the circuit network. Once relays RH1 and RL1 are picked up, they are retained picked up until that car cut passes through retarder section RE1 and relay R1 is released. Hence, for a car having an uneven load and for car cuts having cars of different weight groups, the medium weight storage is provided.

The weight information stored in the relay group RH1—RL1 is at once stored in the second storage group of relays RH3 and RL3. When light weight car information is stored by relay RL1 being energized, current is supplied to relay RL3 from terminal B over back contact 278 of relay RLSP, front contact 79 of relay RL1, wire 80, and winding of relay RL3 to terminal N, and relay RL3 picks up to store the corresponding car weight information. In the event relay RH1 is picked up to store heavy car weight information, current flows from terminal B, over back contact 81 of relay RLSP, front contact 82 of relay RH1, wire 83, and winding of relay RH3 to terminal N, and relay RH3 picks up to store the heavy car weight. When both relays RH1 and RL1 are picked up to store medium car weight, current is supplied to both relays RH3 and RL3 over the circuits traced above and relays RH3 and RL3 are picked up to store the medium car weight. That is, the weight storage combination effected in the group of relays RH1 and RL1 is at once reproduced in the second storage relay group RH3—RL3 providing no car cut ahead of the car being weighed occupies retarder section RE3 so that relay RLSP is picked up in a manner to appear shortly.

Referring next to the end-of-cut determining means, when the head end of a car cut enters the second retarder section RE2, the occupancy relay R2 is at once picked up and thus as soon as this cut vacates retarder section RE1 and occupancy relay R1 is released, the relay RLS is provided with a pickup circuit including terminal B, back contact 67 of relay R1, front contact 84 of relay R2, wire 85, winding of relay RLS and terminal N. Relay RLS on picking up completes a stick circuit through its own front contact 86, wire 87, front contact 84 of relay R2, wire 85 and winding of relay RLS and relay RLS is retained energized until the car cut vacates retarder section RE2 and relay R2 is released.

With relay RLS picked up, a pickup circuit for relay RLSP is completed over front contact 88 of relay RLS, wire 89, and winding of relay RLSP. Relay RLSP on picking up prepares a stick circuit over its own front contact 90 and front contact 91 of occupancy relay R3. Since the storage relay RH3 is provided with a stick circuit that includes its own front contact 92, wire 93 and front contact 81 of relay RLSP, and storage relay RL3 has a similar stick circuit including its front contact 94, wire 93 and front contact 81 of relay RLSP, it is clear that the end-of-cut relays RLS and RLSP function to lock the storage relays RH3 and RL3 at the combination energized when a car cut is weighed while that cut is passing through retarder sections RE2 and RE3.

These weight storage relay groups cooperate with the speed measuring means for controlling the braking force of each retarder section to obtain preselected leaving speeds for the retarder sections as will be described shortly. However, the prescribed leaving speed for each of the three different car weight groups is further determined by the position of the compensating switching means CS. As here provided this compensating switching means CS comprises a manually operable lever NL and a pair of relays F and SL. Normally the lever NL is set at mid position, that is, its solid line position, and both relays F and SL are deenergized. This position of lever NL establishes what I shall term a normal set of leaving speeds, for normal switching. When lever NL is set at its left-hand position, the relay F is energized by a simple circuit and picks up. This establishes what I shall term a fast set of leaving speeds, for fast switching. With the lever NL set at its right-hand position a simple circuit for relay SL is closed and that relay picks up to establish a slow set of leaving speeds for slow switching. Operation of this compensating means from one of its positions to the other is manual and the position selected would be determined by the operator. For example, under high summer temperatures when cars roll more easily the slow leaving speeds may be desired. Under low winter temperatures the high leaving speeds may be better. Also when a free rolling car cut is humped, the operator may wish to select a low leaving speed for that cut. Again emergency conditions may arise and the speed of a car cut reduced so that it is almost stopped in a retarder section and a high leaving speed must be set up to permit the cut to speed up. Again a car cut may for some reason attain too high a speed and it is desired to select a low leaving speed in order to properly slow down the cut. These several variable factors can be quickly compensated by the operator in charge by use of the device CS, as will appear later. Although manual control of this compensating means is shown it may be automatically controlled by suitable devices.

It has been explained that the correct leaving speed is different for cars of different weights and for the different rolling conditions of the cars encountered in switching. Also, in order to obtain a desired leaving speed the braking effort of the retarder must be varied according to these factors, as the cut moves through the retarder, each retarder section being operable as already explained to exert different degrees of braking according to the manner in which current is applied to its control circuits. In automatic control of each retarder section it becomes necessary, therefore, to coordinate the weight factor as reflected by the weight determining means, the speed factor as derived by the speed measuring means and the rolling condition factors as interpreted at the compensating switching means.

To this end, I provide in the apparatus (Fig. 1c) a braking force speed selective means for each retarder section and which means are indicated at PS1, PS2 and PS3 for retarders RE1, RE2 and RE3, respectively. These braking force speed selective means are similar and since an electropneumatic type of retarder is illustrated, preferably they are similar to the speed pressure selective control apparatus described in a copending application for Letters Patent of the United States Serial No. 283,932, filed April 23, 1952, by Edward J. Agnew for Car Retarder Speed Pressure Selective Control Apparatus, now Patent No. 2,727,138, issued December 13, 1955, this Agnew patent and the present application being of common ownership. Reference is made to this Agnew patent for a full description of the braking force speed selective means PS1, PS2 and PS3 through which there are selected according to the different factors, an initial braking force or pressure of the retarder, a partial braking force or pressure to which the initial braking force is reduced as the car speed comes near to the correct leaving speed, full release of the retarder at the desired leaving speed, and application of braking force when a car speeds up, for obtaining a leaving speed desired for a particular car cut.

Only a brief description of these braking force speed selective means PS1, PS2 and PS3 is needed for an understanding of their relationship to the apparatus of the present application and each is disclosed in a more or less conventional manner. Looking at means PS1 for retarder section RE1, it includes a series of six leaving speed selector relays 1PR to 6PR, inclusive, an initial pressure and partial pressure selective network panel IP and a partial pressure release speed and full release speed network panel PFS. The relays 1PR to 6PR are of a standard type of relay and are assigned different speeds at which car cuts are to pass out of the associated retarder section RE1.

The panel IP is provided with several series of jacks, a first one of which is for initial pressure selection and the other one of which is for partial pressure selection. These jacks are provided with connections to contacts of the relays 1PR to 6PR so made that the leaving speed assigned to each relay is translated into energy applied to corresponding jacks, when the relay is energized. Also the panel IP has retarder pressure control jacks which have connections to control circuits leading to the terminals of retarder RE1, these control circuits being completed over wires 95 to 100, inclusive.

By use of plug connectors inserted in selected jacks, circuits are set up in advance by which energy is applied to the terminals of retarder RE1 in such a manner that a different designated initial pressure and partial pressure is effected at retarder RE1 for each of the prescribed leaving speeds assigned to the relays.

The second network panel PFS of means PS1 is provided with different series of jacks which are provided with connections to contacts of the selector relays 1PR to 6PR, to contacts of the relay chains of the associated speed measuring means SM1 and with control relays (not shown) associated with panel IP. This second panel PFS enables circuits to be set up in advance by plug connectors inserted in selected jacks for any one of a series of partial braking force or pressure release speed and full release speed to be prescribed for each leaving speed assigned to the selector relays. When a selector relay is energized to prescribe the corresponding leaving speed then the speed measuring means SM1 automatically selects the prepared circuits when the cut passing through the retarder section attains these selective partial release and full release speeds.

In other words the braking force speed selective means PS1 permits the setting up in advance by plug connectors of circuit arrangements which can be selected by the relays 1PR to 6PR and by the speed measuring means SM1 to automatically control the manner in which energy is applied to the terminals of retarder section RE1 to obtain a leaving speed for that retarder section different for each car weight group and rolling condition. The selection of the relays 1PR to 6PR is in turn governed according to the combination set up at the weight storage relay groups and the position of the compensating switching means CS.

The braking force speed selective means PS2 and PS3 are of substantially the same construction as means PS1 and the means PS2 and PS3 need no further description except to point out that each comprises a series of six leaving speed selector relays 1PR to 6PR, an initial and partial braking force network panel IP and a partial release speed and full release speed network panel PFS and that each means has connections to the control circuits and terminals of the corresponding retarder section.

For the sake of simplicity the electrical connections of the braking force speed selective means PS1, PS2 and PS3 with the associated speed measuring means SM1, SM2 and SM3 are indicated by dotted lines 104, 103 and 102, respectively. Also the electrical connections between the selector relays and network panels of each of the braking force speed selective means are indicated conventionally by dotted lines since all of these connections are disclosed and fully described in the aforementioned E. J. Agnew patent and these specific connections are not a part of my invention.

As an aid in understanding this automatic control of the retarder sections through the braking force speed selective means I shall assume a schedule of leaving speeds that might be prescribed for the different retarder sections, it being recalled that the primary object is to have each car cut pass out of the final retarder section RE3 at a leaving speed preselected according to the weight and rolling conditions of the cut without the cut traveling any appreciable distance in the retarder sections at this leaving speed. That is, the cut is gradually slowed down or permitted to speed up as required as it passes through the retarder sections so that it arrives at the exit of the final retarder section RE3 at the leaving speed desired for a cut of that particular weight and rolling condition.

Taking first the final retarder section RE3 there might be used for light, medium and heavy weight cars leaving speeds of 10, 8 and 6 miles per hour, respectively, under normal switching; leaving speeds of 15, 12 and 10 miles per hour, respectively, under fast switching; and leaving speeds of 8, 6 and 4 miles per hour, respectively, under slow switching. The speeds for the car cuts to pass out of retarder section RE2 might be approximately 2 miles per hour higher in each case than the leaving speeds for the final section RE3, and the speeds for the cuts to pass out of the first section RE1 might be 4 miles per hour higher in each case than those for section RE3.

Thus the schedule would prescribe for retarder section RE2, speeds of 12, 10 and 8 miles per hour under normal switching, 17, 14 and 12 miles per hour under fast switching, and 10, 8 and 6 miles per hour under slow switching for light, medium and heavy weight cars, respectively. For retarder section RE1 the speeds would be 14, 12 and 10 miles per hour under normal switching, 19, 16 and 14 miles per hour under fast switching, and 12, 10 and 8 miles per hour under slow switching for light, medium and heavy cars, respectively.

With this schedule of speeds, the speed selector relays 1PR to 6PR, inclusive, of the braking force speed selective means PS1 for retarder section RE1 might be assigned speeds of 8, 10, 12, 14, 16 and 19 miles per hour, respectively. The relays 1PR to 6PR, inclusive, of means PS2 for retarder section RE2 might be assigned speeds of 6, 8, 10, 12, 14 and 17 miles hour, respectively, and the speed selector relays 1PR to 6PR of means PS3 for retarder section RE3 might be assigned speeds of 4, 6, 8, 10, 12 and 15 miles per hour, respectively.

With this speed schedule and assignment of the speed selector relays of the braking force speed selective means PS1, PS2 and PS3, the 3PR relay of each selective means would be energized under normal or standby conditions since it is here desired that each retarder section be normally closed at the medium car weight setting. To this end the relay 3PR of means PS1 is provided with a normal circuit which can be traced from terminal B over back contacts 105 and 106 of relays RH1 and RL1, respectively, wires 129 and 130, back contacts 131 and 132 of relays F and SL, wire 124, and winding of the 3PR relay of means PS1 to terminal N. The circuit for relay 3PR of means PS2 branches from wire 129 over back contacts 232, 133 and 134 of relays RLS, F and SL, wire 125, and winding of the 3PR relay of means PS2 to terminal N. Also the circuit for relay 3PR of means PS3 extends from terminal B over back contacts 112, 113, 135 and 136 of relays RH3, RL3, F and SL, respectively, wire 127, and winding of the 3PR relay of means PS3 to terminal N.

When a light weight car is humped under normal switching the 4PR relays of each of the braking force speed selective means is energized because speeds of 14, 12 and 10 miles per hour at retarder sections RE1, RE2 and RE3, respectively, are desired.

The 4PR relay of means PS1 is provided with a circuit extending from terminal B over back contact 105 of relay RH1, front contact 106 of relay RL1, wires 107 and 108, back contacts 109 and 110 of relays F and SL, wire 111, and winding of relay 4PR of means PS1 to terminal N.

Relay 4PR of means PS1 in cooperation with speed measuring means SM1 selects circuit arrangements previously set up by plug connectors in the networks IP and PFS of means PS1 for control of the initial and partial braking force, partial release speed and full release speed to obtain the desired leaving speed of 14 miles per hour for retarder RE1.

While this light weight car is passing through the retarder section RE1 the selector relay 4PR of means PS2 is controlled by the first storage relay group, the circuit for the 4PR relay extending from wire 107 of the circuit for relay 4PR of means PS1 through back contacts 114, 115 and 116 of relays RLS, F and SL, respectively, wire 117 and winding of relay 4PR of means PS2 to terminal N. The relay 4PR of means PS2 cooperates with speed measuring means SM2 to select previously prepared circuits of the networks of means PS2 to control retarder section RE2 as required to have this light weight car pass out of retarder section RE2 at the prescribed speed of 12 M. P. H.

When the rear wheels of this light weight car pass out of retarder RE1 and end-of-cut relays RLS and RLSP are picked up, the control of the 4PR relay of means PS2 is transferred to the second storage relay group, the circuit now extending from terminal B over back contact 112 of relay RH3, front contact 113 of relay RL3, front contact 114 of relay RLS and as previously traced. Also at the same time current flows over this last traced circuit to front contact 113 of relay RL3 and thence over back contacts 118 and 119 of relays F and SL, wire 120 and winding of relay 4PR of means PS3 to terminal N. The relay 4PR of means PS3 cooperates with speed measuring means SM3 in a selection of previously prepared circuit arrangements in the networks of means PS3 to obtain a leaving speed of 10 miles per hour at retarder section RE3.

Under fast switching conditions when relay F is picked up the 6PR relays of the means PS1, PS2 and PS3 are selected to obtain the prescribed leaving speeds of 19, 17 and 15 miles per hour at retarder sections RE1, RE2 and RE3 for this light weight car. The circuit for relay 6PR of means PS1 includes back contact 105 of relay RH1, front contact 106 of relay RL1, wires 107 and 108, front contact 109 of relay F, wire 121 and winding of relay 6PR.

At this time the 6PR relay for means PS2 is first controlled from the first storage relay group, the circuit extending from wire 107 over back contact 114 of relay RLS, front contact 115 of relay F, wire 221 and winding of relay 6PR of means PS2 to terminal N. Then when the car vacates retarder RE1 and the end-of-cut relays RLS and RLSP are picked up, the control of the 6PR relay of means PS2 is transferred to the second storage relay group and the circuit includes back contact 112 of relay RH3, front contact 113 of relay RL3, front contact 114 of relay RLS, front contact 115 of relay F, wire 221 and winding of that relay 6PR. At this time current is supplied to relay 6PR of means PS3 by the circuit including back contact 112 of relay RH3, front contact 113 of relay RL3, front contact 122 of relay F, wire 123 and winding of relay 6PR of means PS3.

Under slow switching conditions when relay SL is picked up the 3PR relays are energized to select circuit arrangements in the means PS1, PS2 and PS3 to obtain the preselected leaving speeds of 12, 10 and 8 miles per hour at retarders RE1, RE2 and RE3 for a light weight car. The circuit for relay 3PR of means PS1 is that previously traced up to back contact 109 of relay F, and thence over front contact 110 of relay SL, wire 124 and winding of relay 3PR. The circuit for the 3PR relay of means PS2 at first extends from wire 107 over back contacts 114 and 115 of relays RLS and F, front contact 116 of relay SL, wire 125 and winding of the 3PR relay of means PS2 to terminal N. Then when the car vacates retarder RE1 the control of this 3PR relay of means PS2 is transferred to the second storage relay group and the circuit of relay 3PR of means PS2 includes back contact 112 of relay RH3, front contact 113 of relay RL3, front contact 114 of relay RLS, back contact 115 of relay F, and thence over front contact 116 of relay SL, wire 125 and winding of relay 3PR of means PS2. The circuit for the 3PR relay of means PS3 extends from front contact 113 of relay RL3 over back contact 118 of relay F, front contact 126 of relay SL, wire 127 and winding of that relay 3PR.

Under normal switching the 3PR relays are also energized to obtain the leaving speeds of 12, 10 and 8 miles per hour desired at retarders RE1, RE2 and RE3, respectively, for a medium weight car. This time current for the 3PR relay of means PS1 is supplied from terminal B over front contacts 105 and 128 of relays RH1 and RL1, wires 129 and 130, back contacts 131 and 132 of relays F and SL, wire 124 and winding of relay 3PR of means PS1 to terminal N. At first the circuit for the 3PR relay of means PS2 extends from wire 129 over back contacts 232, 133 and 134 of relays RLS, F and SL, respectively, wire 125 and winding of that 3PR relay. Then the control of relay 3PR of means PS2 is transferred to the second storage relay group when the car vacates retarder RE1 and relays RLS and RLSP are picked up, the 3PR relay of means PS2 receiving current over front contacts 112, 131 and 232 of relays RH3, RL3, and RLS, respectively, back contacts 133 and 134 of relays F and SL, and thence as previously traced. The circuit for the 3PR relay means PS3 includes front contacts 112 and 131 of relays RH3 and RL3, back contacts 135 and 136 of relays F and SL, wire 127, and winding of relay 3PR of means PS3.

Under fast switching of medium weight cars the 5PR relays of the braking force speed selective means are energized to select circuit arrangements previously set up by plug connectors to obtain the desired leaving speed of 16, 14 and 12 miles per hour at retarders RE1, RE2 and RE3, respectively. The circuit for relay 5PR of means PS1 extends from wire 130 over front contact 131 of relay F, wire 137 and winding of relay 5PR to terminal N. At first the relay 5PR of means PS2 is controlled from the first storage relay group by a circuit branching from wire 129 over back contact 232 of relay RLS, front contact 133 of relay F, wire 236, and winding of the relay 5PR of means PS2 to terminal N. Then when the car vacates retarder RE1 and relays RLS and RLSP are energized, the circuit for the 5PR relay of means PS2 includes front contacts 112, 131, 232 and 133 of relays RH3, RL3, RLS and F, respectively, to wire 236 and relay 5PR of means PS2. The circuit for the 5PR relay of means PS3 includes front contacts 112, 131 and 135 of relays RH3, RL3 and F, wire 138, and winding of relay 5PR of means PS3.

Under slow switching of medium weight cars the 2PR relays of the braking force speed selective means are energized to select circuit arrangements set up in the networks to obtain the desired leaving speed of 10, 8 and 6 miles per hour at retarders RE1, RE2 and RE3, respectively. The circuit for relay 2PR of means PS1 is that previously traced up to back contact 131 of relay F and thence over front contact 132 of relay SL, wire 139 and winding of relay 2PR of means PS1 to terminal N. The first circuit for the 2PR relay of means PS2 extends from wire 129 over back contacts 232 and 133 of relays RLS and F, front contact 134 of relay SL, wire 140 and winding of this 2PR relay to terminal N. The second circuit for relay 2PR of means PS2 is traced from terminal B, over front contacts 112, 131 and 232 of relays RH3, RL3 and RLS, respectively, and then as traced for its first circuit. Again the circuit for the 2PR relay of means PS3 extends from terminal B over front contacts 112 and 131 of relays RH3 and RL3, back contact 135 of relay F, front contact 136 of relay SL, wire 141, and winding of that 2PR relay to terminal N.

In the switching of heavy weight cars under normal conditions, the 2PR relays of the braking force speed selective means are also energized to obtain the desired leaving speed of 10, 8 and 6 miles per hour at retarders RE1, RE2 and RE3, respectively. This time the circuit for the 2PR relay of means PS1 is from terminal B, over front contact 105 of relay RH1, back contact 128 of relay RL1, wires 142 and 143, back contacts 144 and 145 of relays F and SL, wire 139, and winding of relay 2PR of means PS1 to terminal N. The first circuit for the 2PR relay of means PS2 extends from wire 142 over back contacts 146, 147 and 148 of relays RLS, F and SL, respectively, wire 140, and winding of that 2PR relay to terminal N. The second circuit for the relay 2PR of means PS2 includes front contact 112 of relay RH3, back contact 131 of relay RL3, front contact 146 of relay RLS, back contacts 147 and 148 of relays F and SL, wire 140, and winding of the relay. The 2PR relay of means PS3 receives current by the same circuit up to back contact 131 of relay RL3 and thence over back contacts 149 and 150 of relays F and SL, wire 141, and winding of the relay.

In fast switching of heavy cars the 4PR relays of the braking force speed selective means are used to select leaving speeds of 14, 12, and 10 miles per hour out of the three retarder sections, respectively. The 4PR relay of means PS1 now receives current over the previously traced circuit up to wire 143 and then over front contact 144 of relay F, wire 111, and winding of relay 4PR of means PS1. The first circuit of the 4PR relay of means PS2 is completed from wire 142 over back contact 146 of relay RLS, front contact 147 of relay F, wire 117, and winding of that relay 4PR. The second circuit for the 4PR relay of means PS2 at this time includes front contact 112 of relay RH3, back contact 131 of relay RL3, front contact 146 of relay RLS, front contact 147 of relay F, wire 117, and winding of the relay. The circuit for the 4PR relay of means PS3 is completed from back contact 131 of relay RL3 over front contact 149 of relay F, wire 120, and winding of that relay.

In slow switching of heavy cars the 1PR relays of the braking force speed selective means are energized to select circuit arrangements set up to obtain the desired leaving speeds of 8, 6 and 4 miles per hour at retarders RE1, RE2 and RE3, respectively. The circuit for the 1PR relay of means PS1 is that traced before up to back contact 144 of relay F and thence over front contact 145 of relay SL, wire 151 and winding of relay 1PR of means PS1. The first circuit for the 1PR relay of means PS2 extends from wire 142 over back contacts 146 and 147 of relays RLS and F, front contact 148 of relay SL, wire 152, and winding of the 1PR relay of means PS2 to terminal N. Then when the car vacates retarder RE1 and relays RLS and RLSP are picked up, the second circuit for relay 1PR of means PS2 includes front contact 112 of relay RH3, back contact 131 of relay RL3, front contact 146 of relay RLS, and as previously traced. The circuit for the 1PR relay of means PS3 extends over front contact 112 of relay RH3, back contact 131 of relay RL3, back contact 149 of relay F, front contact 150 of relay SL, and wire 153 to the winding of that 1PR relay.

It follows from the foregoing description of the apparatus of Figs. 1a, 1b and 1c that the weight of each car cut approaching the retarder is determined and the information stored in the storage relay groups. The storage relays according to their energized combination cooperate with the compensating switching means CS according to its position to selectively energize the speed selector relays of the braking force speed selective means of each retarder section. The relays of each selective means in turn cooperate with the speed measuring means of the corresponding retarder section to select previously set up circuit arrangements for control of the initial braking force, partial braking force, partial release speed and full release speed of the retarder section and thereby obtain a leaving speed preselected for the particular weight and rolling condition of the cut.

It is clear that, as soon as one cut vacates the first retarder section RE1, the first group of storage relays is reset and information of a closely following second cut can be stored and the first retarder section set to properly brake the second cut while the previous settings of the second and third retarder sections for the first cut are retained until the first cut vacates these retarder sections. Also that the compensation switching means can be changed as to its position while a cut is passing through the retarder and correspondingly change the designated leaving speed, such a change being at times needed due to some emergency rolling condition of the cut.

In Fig. 2 there is disclosed a modified form of weight determining transfer and storage apparatus that I may use. In Fig. 2, the stretch of track is formed with an approach track section AT in which the operating element of a weight responsive device is mounted. This weight responsive device includes a circuit contactor attached to rail 2 by a suitable linkage the same as in Fig. 1a. Also, the weight responsive device is provided with three registering relays L, M and H controlled by the contactor to register light, medium and heavy weight cars the same as in Fig. 1a, the relays L, M and H being of the quick acting type having pickup windings controlled by the contactor. In this form of the apparatus the two windings of relay L are connected in multiple in the pickup circuit. Thus relay L is picked up as the wheel of a car of any of the weight groups approaches the point of measurement and is released when the car wheel recedes from the point of measurement and rail 2 restores to its normal position.

The relay M is provided with a stick circuit which includes its own front contact 160, front contact 161 of relay L and its stick winding 55. Relay H is provided with a stick circuit including front contact 160 of relay M, its own front contact 162 and stick winding 54. Hence, for a medium weight car relay M does not release until the contactor is reset and relay L released. Similarly for a heavy weight car both relays M and H are retained picked up until the contactor is reset.

In this form of apparatus the weight information transfer means includes two transfer relays 20P and 60P, a pair of half-wave rectifier elements 163 and 164, and stick circuits. The rectifier elements in series poled reverse to each other are connected across terminals of the windings of relays 20P and 60P. When relay L is picked up current flows from terminal B over back contact 165 of relay H, back contact 166 of relay M, front contact 167 of relay L and winding of relay 20P to terminal N and that relay picks up. When relay M is energized current is supplied from terminal B over back contact 165 of relay H, front contact 166 of relay M, wire 168 to the junction terminal of rectifiers 163 and 164 thence through rectifier 163 and winding of relay 60P to terminal N in multiple with rectifier 164, winding of relay 20P and terminal N, and both relays 20P and 60P are picked up. When relay H is picked up current flows from terminal B over front contact 165 of relay H and winding of relay 60P to terminal H, and relay 60P is picked up. It follows that transfer relays 20P and 60P are energized in three different combinations for the different car weight groups, namely (1) relay 20P is energized and relay 60P is deenergized for light weight cars, (2) both relays 20P and 60P are energized for medium weight cars, and (3) relay 60P is energized and relay 20P deenergized for heavy cars.

Relay 20P is provided with a stick circuit completed over its own front contact 169, back contact 170 of a storage relay RL4 and back contact 171 of relay H. Also relay 60P is provided with a stick circuit completed at its own front contact 172 and back contact 173 of a storage relay RH4. These stick circuits for relays 20P and 60P assure that after a car wheel recedes from the measuring point the car weight registered is retained until the weight information is stored at relays RL4 and RH4.

The storage relays RL4 and RH4 are two winding relays, one winding being used as a pickup winding and the other winding as a stick winding. These storage relays are energized in combinations corresponding to that effected for the transfer relays 20P and 60P. When a light weight car is registered, relay 20P energized and the weight responsive means is reset, current flows from terminal B over back contacts 165, 166, and 167 of relays H, M and L, front contact 174 of relay 20P and pickup winding 175 of relay RL4 to terminal N. Storage relay RL4 is then retained energized by a stick circuit including terminal B, back contact 176 of track relay ATR and front contact 177 of occupancy relay R1 in multiple, front contact 178 of relay RL4, its stick winding 179 and terminal N. When relay 60P is picked up in response to a heavy weight car and the weight responsive means is reset, current flows from terminal B over back contacts 165, 166 and 167 of relays H, M and L, front contact 180 of relay 60P, winding 181 of relay RH4 and terminal N, and that storage relay picks up. Relay RH4 is retained energized by a stick circuit completed for its stick winding 182 at its front contact 183 and back contact 176 of relay ATR and front contact 177 of relay R1 in multiple.

With both relays 20P and 60P picked up when a medium weight car is registered and the weight responsive device is reset, both storage relays RL4 and RH4 are energized by their previously traced pickup circuits and then retained energized by their stick circuits until the car cut has vacated track section AT so that relay ATR is energized, and has passed through retarder section RE1, so that relay R1 is deenergized.

When relay RL4 is picked up and relay RH4 is released to store light weight car information, positive energy is applied over back contact 184 of relay RH4 and front contact 185 of relay RL4, to wire 107 leading to speed selective relays of the braking force speed selective means PS1 and PS2 the same as in the first form of the apparatus. Likewise, when both relays RL4 and RH4 are picked up to store medium weight car information positive energy is applied over front contact 184 of relay RH4 and front contact 186 of relay RL4 to wire 129 leading to the same speed selector relay circuit network described for the first form of the apparatus. Again, when relay RH4 is energized and relay RL4 is deenergized to store heavy car weight information, positive energy is applied over front contact 184 of relay RH4 and back contact 186 of relay RL4 to wire 142 leading to relays of means PS1 and PS2 by the same network provided in the first form of the apparatus. Again under standby conditions, current is applied to wire 129 over back contacts 184 and 185 of the storage relays.

Furthermore the storage relays RL4 and RH4 would control circuits for the second storage relay group the same as the storage relays RL1 and RH1 in the first form of the apparatus.

It is clear that this weight determining means of Fig. 2 can be used to cooperate with the speed measuring means and compensating switching means to obtain leaving speeds desired at each retarder section for the different car weight groups in substantially the same manner as explained for the first form of apparatus and the description need not be repeated.

In Fig. 3 there is disclosed another arrangement of the weight determining means and weight information transfer means that may be used. Here the weight responsive device includes a contactor attached to the track rail 2 in track section AT the same as in Fig. 1. The registering relays H1, M1 and L1 of Fig. 3 are single winding direct current relays each having a pickup circuit that is completed at the light, medium and heavy weight contacts of the contactor as will be apparent from an inspection of the drawing, rectifier elements RC1 and RC2 being inserted in the circuits for relays H1 and M1, respectively. The transfer means includes a relay WTR, having a slow release characteristics, which is provided with a pickup circuit completed at front contact 190 of light weight registering relay L1. Relays M1 and H1 are provided with stick circuits, the circuit for relay M1 being completed at front contact 191 of relay WTR, back contact 192 of relay H1 and its own front contact 193, and the circuit for relay H1 being completed at front contact 191 of relay WTR and its own front contact 192.

The weight information storage means here includes two relays RL5 and RH5 and a pair of half wave rectifier elements 194 and 195, these rectifiers in series poled reverse to each other being connected across terminals of the windings of relays RL5 and RH5. When a wheel of a light weight car moves over the measuring point and relay L1 is picked up, transfer relay WTR is energized. When relay L1 is reset as the car wheel recedes from the measuring point and during the slow release period of relay WTR, current flows from terminal B over back contact 190 of relay L1, front contact 196 of relay WTR, back contacts 197 and 198 of relays H1 and M1 and winding of relay RL5 to terminal N. Thus storage relay RL5 is picked up and then retained energized by its stick circuit completed over its own front contact 199 and back contact 176 of relay ATR and front contact 177 of relay R1 in multiple. When a medium weight car is registered and both relays L1 and M1 are picked up, the transfer relay WTR is energized and then when relay L1 is reset current flows from terminal B over back contact 190 of relay L1, front contact 196 of relay WTR, back contact 197 of relay H1, front contact 198 of relay M1 to the junction of rectifiers 194 and 195 and thence through the windings of relays RL5 and RH5 in multiple to terminal N, and both storage relays are energized. The storage relays are then retained energized by their stick circuits completed at back contact 176 of relay ATR and front contact 177 of relay R1 in multiple.

Again when a heavy weight car moves over the point of measurement and all three registering relays are energized, and relay L1 is reset, current flows over back contact 190 of relay L1, front contact 196 of relay WTR, front contact 197 of relay H1 and winding of relay RH5 and that storage relay is picked up and then retained energized by its stick circuit. Under standby conditions with both relays RL5 and RH5 released closing back contacts 201 and 202, current is applied to wire 129 leading to the medium braking circuit network. When relay RL5 is picked up in response to the weighing of a light weight car, current is applied over its front contact 201 to wire 107 leading to the light car braking force circuit network. When both relays RL5 and RH5 are picked up for a medium weight car current is supplied over front contacts 202 and 203 to wire 129 leading to the corresponding network.

Again when relay RH5 is picked up for a heavy weight car current is supplied over front contact 202 and back contact 203 to wire 142 leading to the corresponding circuit network. It is apparent that the weight determining means of Fig. 3 will cooperate with the other devices to automatically control the retarder sections to obtain the desired leaving speed in a manner substantially the same as described for the first form of the apparatus.

It is to be pointed out that in each form of the apparatus the weight information transfer means functions to prevent false weight information from being transferred to the storage relay groups. That is the weight registered is not transferred to the storage relays until the car wheel recedes from the weighing device and the device reset. Also the registered weight is retained by the transfer means long enough to assure it is stored.

Although I have herein shown and described several forms of car retarder speed control apparatus embodying my invention, it is to be understood that various changes and modifications may be made within the scope of the appended claims without departing from the spirit and scope of my invention.

Having thus described my invention what I claim is:

1. In combination with a stretch of railway track equipped with a car retarder operable to exert different braking forces and having control means responsive to current selectively supplied thereto to select one of said braking forces, a car weight determining means including an operating element mounted in the stretch and operable to a first, a second, and a third circuit controlling position in response to a first, a second and a third car weight respectively; a first, and a second weight information storage relay normally deenergized, pickup circuit means including said positions of said weight determining means with connections to said storage relays to energize said first relay only in response to said first car weight, to energize both said relays in response to said second car weight and energize said second relay only in response to said third car weight, a stick circuit means including a contact closed in response to a car passing through the retarder with connections to said storage relays to retain them energized in the arrangement previously effected by the weight determining means, and control circuit means including contacts of said storage relays with connections to the retarder control means to selectively supply current thereto according to the energized arrangement of the storage relays.

2. In combination with a stretch of railway track equipped with a car retarder having a control means and operable to exert different braking forces according to the manner in which current is selectively supplied to said control means, a car weighing device having an operating element mounted in the stretch and operable by each pair of wheels of a car approaching the retarder, said device having a biased position to which it resets and a first, a second and a third position to which it is operated in response to the pairs of wheels of cars of a first, a second and a third weight respectively, weight transfer relay means, a first and a second weight storage relay normally deenergized, circuit means including a contact closed at the first operated position of said device and deenergized position contacts of said storage relays with connections to the transfer relay means to energize the transfer relay means while a car moves over said operating element, pickup circuit means including a contact closed at the biased position of said device, a contact closed when said transfer relay means is energized and contacts selectively closed according to the position to which said device is operated with connections to said storage relays to energize said first storage relay only, to energize both said storage relays or to energize said second storage relay only in response to operation of said device to its first, second, or third position, respectively, a stick circuit means including a contact closed when a car occupies the retarder with connections to said storage relays to retain them energized in the arrangement previously effected by said pickup circuit means, and control circuit means including contacts of said storage relays with connections to the retarder control means to selectively supply current thereto according to the energized arrangement of the storage relays.

3. In combination with a stretch of railway track over which cars move in a given direction, said stretch being equipped with a car retarder operable to exert different braking forces and a retarder control means responsive to current selectively supplied thereto to select between said braking forces, a car weight responsive means including an operating element and three registering relays one for each of three different car weights, said operating element mounted in the stretch in the approach to the retarder and responsive to each pair of car wheels of a car approaching the retarder, said operating element being operable to a different circuit controlling position for each of said different car weights, pickup circuit means including said positions of the operating element with connections to the registering relays to selectively energize the relays according to the weight of a car, a first and a second weight information storage relay normally deenergized, another pickup circuit means including contacts of said registering relays with connections to said storage relays to energize said first storage relay only in response to a first one of said car weights, to energize both said storage relays in response to a second one of said car weights and to energize said second storage relay only in response to a third one of said car weights, stick circuit means including a contact closed in response to a car passing through the retarder with connections to said storage relays to retain them energized in the arrangement previously effected by their pickup circuit means, and control circuit means including contacts of the storage relays and having connections to the retarder control means to selectively supply current thereto according to the energized arrangement of the storage relays to thereby set up a different braking force for the retarder for each of said car weights prior to the car entering the retarder.

4. In combination with a stretch of railway track equipped with a retarder operable to exert different braking forces and a retarder control means responsive to current selectively supplied thereto to select one of said braking forces, a car weight determining means including an operating element and three registering relays one each for light, medium, and heavy car weights, said operating element having connections to the track and operable to a first, second and third position in response to light, medium and heavy weight cars respectively; pickup circuit means including contacts closed selectively in said positions of said element with connections to said registering relays to selectively energize the relays according to the weight of a car moving over the operating element, stick circuit means with connections to the medium and heavy weight registering relays to retain them energized when previously energized until the light weight registering relay is deenergized as a car recedes from said operating element, a first and a second weight storage relay normally deenergized, another pickup circuit means with connections to said storage relays controlled by contacts of the registering relays and effective only when the light weight registering relay is released to energize said first storage relay only in response to a light weight car, to energize both storage relays in response to a medium weight car and to energize said second storage relay only in response to a heavy weight car, another stick circuit means including a contact closed when a car occupies the retarder with connections to the storage relays to retain them energized at the arrangement previously effected by said another pickup circuit means, and control circuit means including contacts of said storage relays with connections to the retarder control means to selectively energize said control means according to the energized arrangement of the storage relays.

5. In combination with a stretch of railway track, a car weight determining means for classifying cars into a plurality of different light to heavy car weight groups, said weight determining means comprising a weighing device and a group of registering relays one for each of the different car weight groups, a transfer relay, a group of weight information storage relays normally deenergized and energizable in a different arrangement for each of the car weight groups; said weighing device having a trackway element operable by each pair of wheels of a car and contacts actuated thereby, the weighing device biased to an initial position and actuated toward an extreme position to close its contacts to an extent determined by the weight of a car whose wheels operate the trackway element, pickup circuit means including the contacts of said weighing device with connections to the registering relays for energizing all the relays up to the relay for the weight group corresponding to the extent the weighing device is operated, a pickup circuit with connections to said transfer relay and including an energized position contact of the lowest weight group registering relay, a stick circuit for said transfer relay including a deenergized position contact of said storage relays, a stick circuit network including an energized position contact of said transfer relay with connections to said registering relays to retain energized all previously energized registering relays except the lowest weight group registering relay and another pickup circuit means with connections to said storage relays and including an energized position contact of said transfer relay, a deenergized position contact of the lowest weight group registering relay and contacts of the other registering relays to energize the storage relays in an arrangement corresponding to the weight group of the car which actuates said trackway element.

6. In combination with a stretch of railway track, a car weight determining means for classifying cars into light, medium and heavy weight groups, said car weight determining means comprising a weighing device and a light, a medium and a heavy weight registering relay; a transfer relay, a first and a second weight information storage relay; said weighing device having a trackway element responsive to each pair of wheels of a car to close light, medium and heavy weight contacts according to the weight of a car whose wheels actuate said trackway element, a pickup circuit for each said registering relay with each of the pickup circuits including the corresponding contact of the weighing device, a pickup circuit for said transfer relay including an energized position contact of said light weight registering relay, stick circuit means for said transfer relay including back contacts of said storage relays in multiple, a stick circuit for each of the medium and heavy weight registering relays and each circuit including an energized position contact of said transfer relay, a pick up circuit for said first storage relay including an energized position contact of said transfer relay and a deenergized position contact of each of the light and heavy weight registering relays, and a pickup circuit for said second storage relay including an energized position contact of each of the transfer relay and medium weight registering relay and a deenergized position contact of said light weight registering relay.

7. In combination with a stretch of railway track, a car weight determining means for classifying cars into light, medium and heavy weight groups, said weight determining means comprising a weight responsive device and a light, a medium and a heavy weight group registering relay; a transfer relay, a first and a second weight information storage relay, said weight responsive device having a contactor attached to a track rail to be deflected by the leading pair of wheels of a car to an extent determined by the weight of the car, said contactor having light, medium and heavy weight contacts which are closed in that order as the leading wheels approach the point of attachment to the rail according to the weight group of the car and which are opened in the reverse order as the car wheels recede from the point of attachment, a pickup circuit for each of said registering relays with each circuit including the corresponding contactor contact, a stick circuit for each of the medium and heavy weight registering relays and each of which stick circuits includes a front contact closed in response to the energization of the light weight registering relay, a pickup circuit for said transfer relay including a front contact of said light weight registering relay, and a pickup circuit network with connection to said storage relays and including a back contact of said light weight registering relay, a front contact of said transfer relay and front and back contacts of said medium and heavy weight registering relays to energize said first storage relay only for a light weight car, to energize both storage relays for a medium weight car and to energize said second storage relay only for a heavy weight car.

8. In combination with a stretch of railway track, a car weight determining means for classifying cars into light and heavy weight groups, said car weight determining means comprising a weight responsive device and a light and a heavy weight registering relay, a transfer relay, a first and a second weight information storage relay, said weight responsive device including a contactor with attachment to a track rail to be actuated by the deflection of the rail caused by each pair of wheels of a car moving over the point of attachment, said contactor having a light and heavy weight contact which are closed in that order as a car wheel approaches the point of attachment depending on the weight of the car and which are opened in the reverse order as the car wheel recedes from the point of attachment, a pickup circuit for each of the registering relays and each of which circuits includes the corresponding contact of the contactor, a pickup circuit for said transfer relay including a front contact of said light weight registering relay, a stick circuit for said transfer relay including two paths one of which includes a back contact of said first storage relay and a back contact of said heavy weight registering relay and the other of which paths includes a back contact of said second storage relay and a contact closed when the heavy weight registering relay is picked up, a stick circuit for said heavy weight registering relay including a front contact of said transfer relay, a pickup circuit for said first storage relay including a front contact of said transfer relay, and back contacts of said light weight and said heavy weight registering relays, and a pickup circuit for said second storage relay including a front contact of said transfer relay, a back contact of said light weight registering relay and a contact closed when said heavy weight registering relay is picked up.

9. In combination with a stretch of railway track, a car weight determining means to detect cars exceeding a given weight, said weight determining means comprising a weight responsive device and a weight registering relay, a transfer relay, a weight information storage relay, said weight responsive device including a contactor with attachment to a track rail to be actuated by the deflection of the rail caused by a pair of wheels of a car moving over the point of attachment, said contactor biased to an initial position and having a first contact closed in response to all car wheels moving over the point of attachment and a second contact closed only in response to wheels of a car exceeding said given weight, a pickup circuit for said registering relay including said second contactor contact, pickup circuit means for said transfer relay including said first contactor contact, a stick circuit for said transfer relay including a back contact of said storage relay, a stick circuit for said registering relay including a front contact of said transfer relay, a pickup circuit for said storage relay including a front contact of said transfer relay, a contact closed when said registering relay is picked up and a contact closed only when said contactor is set at its biased position, and a stick circuit for said storage relay including a contact closed in response to a car occupying a given section of the stretch of track.

10. In combination with a stretch of railway track, a car weight determining means classifying cars into light, medium and heavy weight groups, said weight determining means comprising a weight responsive device and a light, a medium and a heavy weight registering relay; a transfer relay means, a first and a second weight information storage relay, said weight responsive device having a trackway element biased to an initial position and operable toward an extreme position to an extent determined by the weight of a car when a wheel of the car moves over the trackway element, pickup circuit means including contacts actuated by the trackway element with connections to the registering relays to energize them in the light, medium and heavy relay order according to the weight group of a car when a wheel of the car approaches said trackway element and to deenergize them in the reverse order as the car wheel recedes from the trackway element, a stick circuit for each of the medium and heavy weight registering relays and each stick circuit being interrupted in response to the deenergization of the light weight registering relay, said transfer relay means including a pair of relays and a pair of half wave rectifier elements, said rectifier elements in series poled reverse to each other being connected across winding terminals of the pair of relays, a first circuit including a front contact of said light weight registering relay with connections to a first one of said pair of relays to energize that relay, a second circuit including a front contact of said medium weight registering relay with connections to the junction of said rectifier elements to energize both relays of said pair, a third circuit including a front contact of the heavy weight registering relay with connection to a second one of said pair of relays to energize that relay, a stick circuit for said first one of the pair of relays including a back contact of said first storage relay, a stick circuit for said second one of the pair of relays including a back contact of said second storage relay, a pickup circuit for said first storage relay including a back contact of the light weight registering relay and a front contact of said first one of said pair of relays, and a pickup circuit for said second storage relay including a back contact of said light weight registering relay and a front contact of said second one of said pair of relays.

11. In combination with a stretch of railway track, a car weight determining means for classifying cars into light, medium and heavy weight groups, said weight determining means comprising a weight responsive device and a light, a medium and a heavy weight group registering relay; a transfer relay, a first and a second weight information storage relay; said weight responsive device having a contactor attached to a track rail to be deflected by the wheels of a car to an extent determined by the weight of the car, said contactor having light, medium and heavy weight contacts which are closed in that order as a wheel of a car approaches the point of attachment to the rail according to the weight group of the car and which are opened in the reverse order as the car wheel recedes from the point of attachment, a pickup circuit for each of said registering relays with each circuit including the corresponding contactor contact, a stick circuit for each of the medium and heavy weight registering relays and each of which stick circuits include a front contact of said transfer relay, a pickup circuit for said transfer relay including a front contact of said light weight registering relay, a pair of half wave rectifier elements, said rectifier elements in series poled reverse to each other being connected to terminals of the windings of said storage relays, a first circuit including a back contact of the light weight registering relay, a front contact of the transfer relay and a winding of said first storage relay to energize that relay and store light weight car information, a second circuit including a back contact of the light weight registering relay, a front contact of each of the transfer and medium weight registering relays with connection to the junction of said rectifiers to energize both said storage relays and store medium weight car information, and a third circuit including a back contact of the light weight registering relay, a front contact of each of the transfer and heavy weight registering relays and the winding of the second storage relay to energize that relay and store heavy weight car information.

12. In combination with a stretch of railway track equipped with a first and a second retarder section each independently operable to exert different braking forces and a first and a second retarder control means each responsive to current selectively supplied thereto to select between the braking forces of the corresponding retarder section, a car weight determining means having an operating element mounted in the stretch in the approach to said retarder sections and operable in response to a pair of wheels of a car approaching the retarder sections, said element actuated to a first or a second circuit controlling position according as the car actuating the element is of a first or a second weight, a first and a second pair of weight information storage relays, a first and a second occupancy relay for said first and second retarder sections, each said occupancy relay having connections to its retarder section to operate the relay to a first or a second position according as the retarder section is not or is occupied by a car, pickup circuit means including contacts of said operating element and with connections to the relays of said pairs of storage relays to selectively energize the relays of each pair according as the element is operated to its first or second circuit controlling position, stick circuit means including a second position contact of said first occupancy relay with connection to the first pair of storage relays to retain energized any previously energized relay of that pair while a car occupies the first retarder section, stick circuit means including a second position contact of said second occupancy relay with connections to the second pair of storage relays to retain energized any previously energized relay of that pair while a car occupies the second retarder section, control circuits including contacts of the relays of said first pair of storage relays to selectively supply current to said control means of both retarder sections according to the car weight information stored in that pair of storage relays, and other control circuits including contacts of the relays of said second pair of storage relays to selectively supply current only to the control means for the second retarder section according to the car weight information stored in the second pair of storage relays.

13. In combination with a stretch of railway track equipped with a first and a second retarder each independently operable to exert different braking forces and a retarder control means for each retarder, each control means being responsive to current selectively supplied thereto to select one of the braking forces of the corresponding retarder, a first and a second occupancy relay for said first and second retarders respectively, each said occupancy relay being operated to a first or a second position according as its retarder is not or is occupied by a car cut, a car weighing device having an element mounted in the stretch in the approach to the first retarder and operable from a biased position toward an extreme position by cars to an extent determined by the weight of the car, a first and a second weight information storage relay means each energizable to a plurality of combinations, pickup circuit means including contacts actuated by said weighing device with connections to said first and said second storage relay means to energize each relay means to a different one of said plurality of combinations for each of a plurality of different car weights, a first stick circuit means including a second position contact, said first occupancy relay with connections to said first storage relay means to retain it energized in the combination previously established, a second stick circuit means including a second position contact, said second occupancy relay with connections to said second storage relay means to retain it energized in the combination previously established, a first control circuit network including contacts of said first storage relay means with connections to both the first and second retarder control means to selectively supply current thereto according to the energized combination of the first storage relay means while a car cut occupies either the first retarder alone or occupies both retarders, and a second control circuit network including contacts of said second storage relay means with connections to the second retarder control means to selectively supply current thereto according to the energized combination of the second storage relay means after a car cut vacates the first retarder and occupies the second retarder only.

14. In combination with a stretch of railway track equipped with a first, second and third retarder through which cars pass in the order named and each independently operable to exert different braking forces, each retarder having a control means responsive to current selectively supplied thereto to select one of the braking forces of that retarder, an occupancy relay for each retarder, each said occupancy relay having connections to the track within the corresponding retarder and operable to a first or a second position according as the retarder is not or is occupied by a car, car weight determining means including a weighing device mounted in the stretch and operable from an intial position toward an extreme position by cars approaching the retarder to an extent determined by the weight of the car, a first and a second group of weight information storage relays with each group energizable in different combinations, pickup circuit means responsive to the position to which said weighing device is operated by a car and with connections to said relay groups to energize each said group in a particular combination according to the measured weight of each car, a stick circuit means including a second position contact of the first retarder occupancy relay with connections to the first storage relay group to retain that group energized at the combination initially energized, another stick circuit means including second position contacts of the occupancy relays of the second and third retarders with connections to the second storage relay group to retain that group energized at the combination initially energized, circuit means including contacts of the first storage relay group with connections to both the first and second retarder control means to selectively supply current thereto according to the energized combination of the first storage relay group while a car is passing through the first retarder and entering the second retarder, and another circuit means including contacts of the second storage relay group with connections to both the second and third retarder control means to selectively supply current thereto according to the energized combinations of the second storage relay group subsequent to the car vacating the first retarder and while passing through the second and third retarders.

15. In combination with a stretch of railway track equipped with a first, a second and a third retarder through which cars pass in the order named, each retarder having a control means and operable to exert different braking forces according to the maner in which current is selectively supplied to said control means, an occupancy relay for each retarder, each said occupancy relay with connections to its retarder and operable to a first or a second position according as the retarder is not or is occupied by a car cut, a first and a second end-of-cut relay having a pickup circuit means including a first position contact of the first retarder occupancy relay and a second position contact of the second retarder occupancy relay, said first end-of-cut relay having a stick circuit including a second position contact of the second retarder occupancy relay and the second end-of-cut relay having a stick circuit including a second position contact of the third retarder occupancy relay, a first and a second group of car weight storage relays, each said group energizable in different arrangements, weight registering means having an element actuated by cars approaching the retarders with connections to each said storage relay groups to initially energize each group in an arrangement preselected for each different car weight, a stick circuit means including a second position contact of the first retarder occupancy relay with connections to said first storage relay group to retain the group energized in the arrangement initially energized, another stick circuit means including an energized position contact of said second end-of-cut relay with connections to said second storage relay group to retain that group energized in the arrangement initially energized, a first control circuit means including contacts of said first storage relay group with connections to the first retarder control means to selectively supply current thereto, a second control circuit means including contacts of the first storage relay group and back contacts of the first end-of-cut relay with connection to the second retarder control means to selectively supply current thereto, a third control circuit means including contacts of the second storage relay group and front contacts of said first end-of-cut relay with connections to the second retarder control means to selectively supply current thereto, and a fourth control circuit means including contacts of said second storage relay group with connections to the third retarder control means to selectively supply current thereto.

16. In combination with a stretch of railway track equipped with a car retarder and formed with a track section in the approach to the retarder, the retarder being operable to exert different braking forces according to the control terminal to which current is supplied to obtain a plurality of different speeds at which car cuts may leave the retarder, an occupancy relay means with connections to the retarder and the approach track section and operable to a first or a second position as the track section and retarder are not or are occupied by a car cut, a car weight storage relay means energizable in a plurality of different arrangements, a car weighing means including an element mounted in the track section and circuits having connections with the storage relay means to initially energize the storage relay means in a different arrangement according to the measured weight of each car, a stick circuit means including a second position contact of said occupancy relay means with connections to the storage relay means to retain it energized at the arrangement initially energized, a car speed measuring means having connections with the retarder and operable to repeatedly measure the speed of a car cut passing through the retarder, a car rolling condition compensating switching means operable to a first, a second and a third position according as normal, high or low retarder leaving speeds are desired, a braking force speed selective means including circuit networks adaptable of being prearranged with different control circuits and having connections with the retarder control terminals to selectively supply current to the retarder; and circuit means including contacts of said weight storage relay means, contacts of said speed measuring means and contacts of said compensating switching means with connections to said braking force speed selective means to automatically select prepared control circuits thereof which obtain a retarder leaving speed desired according to the weight and rolling condition of the car cut passing through the retarder.

17. In combination with a stretch of railway track equipped with a car retarder operable to exert different braking forces according to the control terminal to which current is supplied, a car speed measuring means having connections with the retarder and operable to repeatedly measure the speed of a car cut passing through the retarder, a car rolling condition compensating switching means operable to a first, a second and a third position according as normal, high or low leaving speeds for car cuts to leave the retarder are desired, a braking force selective means including circuit networks which can be prearranged with different control circuits and having connections with the retarder terminals to selectively supply current thereto according to the control circuits made effective, and circuit means including contacts of said speed measuring means and contacts of said switching means with connections to said braking force speed selective means to automatically render effective control circuits of the braking force speed selective means according to the position of said switching means and the speed of a car cut passing through the retarder to obtain different speeds preselected for the cut to leave the retarder.

18. In a railway car weighing and weight information storage means, the combination comprising, a weight responsive device mounted at a measuring point in a stretch of railway track and operable to a circuit energizing condition in response to a wheel of a car passing the measuring point, a normally released registering relay having a winding with connections to said device and energized and picked up in response to said energizing condition of said device, a normally released transfer relay having a winding with connections to a pickup circuit which includes a front contact of said registering relay, said transfer relay having means to retain the relay picked up subsequent to said registering relay releasing when the car wheel recedes from the measuring point and later to release the relay, and a normally released weight and information storage relay having a winding with connections to a pickup circuit which includes in series a back contact of said registering relay and a front contact of said transfer relay and with a stick circuit which includes a contact closed in response to the car passing through a given section of the stretch of railway track.

19. In a railway car weighing and weight information storage means, the combination comprising, a weight responsive device mounted at a measuring point in a stretch of a railway track and operable to a circuit energizing condition in response to a wheel of a car passing the measuring point, a normally released registering relay having a winding with connections to said device and energized and picked up in response to said energizing condition of said device, a normally released transfer relay having a winding and a continuity-transfer contact, a stick circuit including the back contact of said continuity-transfer contact with connections to the winding of said registering relay, a pickup circuit including a front contact of said registering relay with connections to the winding of said transfer relay to pickup that relay, another stick circuit including the front contact of said continuity-transfer contact with connections to the winding of said transfer relay to retain the relay picked up subsequent to said registering relay releasing when the car wheel recedes from the measuring point, a normally released weight information storage relay having a winding with connections to a pickup circuit which includes in series a back contact of said registering relay and a front contact of said transfer relay and with a stick circuit which includes a contact closed in response to the car passing through a given section of the stretch of railway track, and said storage relay having a back contact interposed in said another stick circuit of said transfer relay.

20. In combination with a stretch of railway track, a car weight determining means to detect cars exceeding a given weight, said weight determining means comprising a weight responsive device and a weight registering relay, a transfer relay, a weight information storage relay, said weight responsive device including a contactor with attachment to a track rail to be actuated by the deflection of the rail caused by a pair of wheels of a car moving over the point of attachment, said contactor biased to an initial position and having a first contact closed in response to all car wheels moving over the point of attachment and a second contact closed only in response to wheels of a car exceeding said given weight, a pickup circuit for said registering relay including said second contactor contact, pickup circuit means for said transfer relay including said first contactor contact, a stick circuit for said registering relay including a front contact of said transfer relay, a pickup circuit for said storage relay including a front contact of said transfer relay, a contact closed when said registering relay is picked up and a contact closed only when said contactor is set at its biased position, and a stick circuit for said storage relay including a contact closed in response to a car occupying a given section of the stretch of track.

References Cited in the file of this patent
UNITED STATES PATENTS

| | | |
|---|---|---|
| 1,626,920 | Coleman | May 3, 1927 |
| 1,766,539 | Prescott | June 24, 1930 |
| 2,216,610 | Culbertson | Oct. 1, 1940 |
| 2,320,802 | Snavely | June 1, 1943 |
| 2,541,915 | Culver | Feb. 13, 1951 |

UNITED STATES PATENT OFFICE
CERTIFICATE OF CORRECTION

Patent No, 2,819,682                                              January 14, 1958

Edward C. Falkowski

It is hereby certified that error appears in the printed specification of the above numbered patent requiring correction and that the said Letters Patent should read as corrected below.

Column 25, line 14, after "means" insert -- for --; column 26, line 10, for "relay," read -- relay and --; column 27, lines 7 and 10, for "contact,", each occurrence, read -- contact of --; column 29, line 39, strike out "and", second occurrence; column 30, line 7, for "pickup" read -- pick up --.

Signed and sealed this 23rd day of June 1959.

(SEAL)
Attest:

KARL H. AXLINE                                                   ROBERT C. WATSON

Attesting Officer                                              Commissioner of Patents